US009262746B2

(12) United States Patent
Linton et al.

(10) Patent No.: US 9,262,746 B2
(45) Date of Patent: Feb. 16, 2016

(54) PRESCRIPTION OF ELECTRONIC RESOURCES BASED ON OBSERVATIONAL ASSESSMENTS

(75) Inventors: Chet Dee Linton, Sandy, UT (US); Cory John Linton, Draper, UT (US); Jonathan E. Smalley, Riverton, UT (US); Derris Todd Moore, Alpine, UT (US)

(73) Assignee: SCHOOL IMPROVEMENT NETWORK, LLC, Midvale, UT (US)

( * ) Notice: Subject to any disclaimer, the term of this patent is extended or adjusted under 35 U.S.C. 154(b) by 0 days.

(21) Appl. No.: 13/570,839

(22) Filed: Aug. 9, 2012

(65) Prior Publication Data
US 2013/0042007 A1     Feb. 14, 2013

Related U.S. Application Data

(60) Provisional application No. 61/523,156, filed on Aug. 12, 2011, provisional application No. 61/523,187, filed on Aug. 12, 2011, provisional application No. 61/654,813, filed on Jun. 2, 2012.

(51) Int. Cl.
*G06Q 10/10* (2012.01)
*H04L 12/18* (2006.01)
(Continued)

(52) U.S. Cl.
CPC ............ *G06Q 10/10* (2013.01); *H04L 12/1831* (2013.01); *G06Q 50/20* (2013.01); *G06Q 50/205* (2013.01); *H04L 12/1813* (2013.01); *H04L 12/1818* (2013.01); *H04L 29/06408* (2013.01); *H04L 29/06414* (2013.01)

(58) Field of Classification Search
CPC ..... H04L 65/4015; H04L 67/02; H04L 12/02; H04L 12/1822; H04L 29/06027; H04L 29/06176

USPC ......................................................... 709/226
See application file for complete search history.

(56) References Cited

U.S. PATENT DOCUMENTS 4,375,080 A    2/1983   Barry et al.
4,798,543 A    1/1989   Spiece
(Continued)

OTHER PUBLICATIONS

Goals 2000: Reforming Education to Improve Student Achievement, Apr. 30, 1998, retrieved online Dec. 16, 2011, 9 pgs.
(Continued)

*Primary Examiner* — Tom Y Chang
(74) *Attorney, Agent, or Firm* — Patent Law Works LLP

(57) ABSTRACT

Various embodiments for prescribing electronic resources based on observational assessments are described. One example system includes a communication unit for sending and receiving data, a recommendation engine, and an assignment engine. The recommendation engine receives observation data related to a target subject, identifies one or more electronic resources that correspond to the observation data, and provides data describing the one or more electronic resources for display to an observer. The recommendation engine is coupled to the communication unit to provide the data representing the one or more electronic resources. The assignment engine receives an assignment request requesting an assignment of at least one electronic resource from the one or more electronic resources to the target subject for completion. The assignment engine also assigns the at least one electronic resource to the target subject. The assignment engine is coupled to the communication unit to receive the assignment request.

30 Claims, 11 Drawing Sheets

(51) Int. Cl.
*H04L 29/06* (2006.01)
*G06Q 50/20* (2012.01)

(56) References Cited

U.S. PATENT DOCUMENTS

| | | | |
|---|---|---|---|
| 5,002,491 A | 3/1991 | Abrahamson et al. | |
| 5,372,507 A | 12/1994 | Goleh | |
| 5,528,281 A | 6/1996 | Grady et al. | |
| 5,590,057 A | 12/1996 | Fletcher et al. | |
| 5,601,436 A | 2/1997 | Sudman et al. | |
| 5,712,906 A | 1/1998 | Grady et al. | |
| 5,737,600 A | 4/1998 | Geiner et al. | |
| 5,749,736 A | 5/1998 | Griswold et al. | |
| 5,787,156 A | 7/1998 | Katz | |
| 5,788,508 A | 8/1998 | Lee et al. | |
| 5,802,283 A | 9/1998 | Grady et al. | |
| 5,823,788 A | 10/1998 | Lemelson et al. | |
| 5,890,911 A | 4/1999 | Griswold et al. | |
| 5,898,762 A | 4/1999 | Katz | |
| 5,957,699 A | 9/1999 | Peterson et al. | |
| 5,987,443 A | 11/1999 | Nichols et al. | |
| 6,024,577 A | 2/2000 | Wadahama et al. | |
| 6,039,575 A | 3/2000 | L'Allier et al. | |
| 6,064,856 A | 5/2000 | Lee et al. | |
| 6,075,968 A | 6/2000 | Morris et al. | |
| 6,099,320 A | 8/2000 | Papadopoulos | |
| 6,112,049 A | 8/2000 | Sonnenfeld | |
| 6,149,441 A | 11/2000 | Pellegrino et al. | |
| 6,155,840 A | 12/2000 | Sallette | |
| 6,157,808 A | 12/2000 | Hollingsworth | |
| 6,190,178 B1 | 2/2001 | Oh | |
| 6,282,404 B1 | 8/2001 | Linton | |
| 6,301,462 B1 | 10/2001 | Freeman et al. | |
| 6,302,698 B1 | 10/2001 | Ziv-El | |
| 6,386,883 B2 | 5/2002 | Siefert | |
| 6,496,681 B1 | 12/2002 | Linton | |
| 6,556,974 B1 | 4/2003 | D'Alessandro | |
| 6,676,413 B1 | 1/2004 | Best et al. | |
| 6,760,748 B1 | 7/2004 | Hakim | |
| 6,782,396 B2 | 8/2004 | Greene et al. | |
| 6,789,047 B1* | 9/2004 | Woodson | 702/182 |
| 6,904,263 B2 | 6/2005 | Grudnitski et al. | |
| 6,944,596 B1 | 9/2005 | Gray et al. | |
| 6,974,328 B2 | 12/2005 | Aspe et al. | |
| 7,593,861 B2 | 9/2009 | Morrel-Samuels | |
| 7,949,552 B2 | 5/2011 | Korenblit et al. | |
| 8,005,709 B2 | 8/2011 | King et al. | |
| 8,275,305 B2* | 9/2012 | Hutchinson | G09B 7/02 434/322 |
| 2001/0039002 A1 | 11/2001 | Delehanty | |
| 2002/0091656 A1 | 7/2002 | Linton | |
| 2002/0146676 A1 | 10/2002 | Reynolds | |
| 2003/0046265 A1 | 3/2003 | Orton et al. | |
| 2003/0228561 A1 | 12/2003 | Escalante | |
| 2003/0232314 A1 | 12/2003 | Stout et al. | |
| 2004/0018477 A1 | 1/2004 | Olsen | |
| 2004/0063085 A1 | 4/2004 | Ivanir et al. | |
| 2004/0076941 A1 | 4/2004 | Cunningham et al. | |
| 2005/0026119 A1 | 2/2005 | Ellis et al. | |
| 2005/0026131 A1 | 2/2005 | Elzinga et al. | |
| 2005/0033633 A1 | 2/2005 | LaPasta et al. | |
| 2006/0147882 A1 | 7/2006 | Sambucetti et al. | |
| 2007/0190504 A1 | 8/2007 | Schwartz et al. | |
| 2008/0003552 A1 | 1/2008 | Supe | |
| 2008/0014569 A1* | 1/2008 | Holiday et al. | 434/351 |
| 2008/0288485 A1* | 11/2008 | Lager | G09B 7/04 |
| 2009/0031215 A1* | 1/2009 | Collier, II | G06F 17/211 715/255 |
| 2009/0035733 A1* | 2/2009 | Meitar et al. | 434/118 |
| 2010/0010880 A1 | 1/2010 | Toth et al. | |
| 2010/0306016 A1 | 12/2010 | Solaro et al. | |
| 2011/0039249 A1* | 2/2011 | Packard et al. | 434/362 |
| 2011/0047224 A1 | 2/2011 | Fox | |
| 2011/0053133 A1 | 3/2011 | Rock et al. | |
| 2011/0070567 A1 | 3/2011 | Linton | |
| 2011/0076664 A1* | 3/2011 | Holt et al. | 434/362 |
| 2012/0029962 A1 | 2/2012 | Podgurny et al. | |
| 2012/0159337 A1* | 6/2012 | Travilla et al. | 715/738 |
| 2012/0276516 A1* | 11/2012 | Teskey et al. | 434/362 |
| 2013/0130217 A1* | 5/2013 | Dohring | G09B 5/00 434/350 |
| 2013/0130219 A1 | 5/2013 | Elzinga et al. | |

OTHER PUBLICATIONS

International Search Report and Written Opinion for PCT/US12/50079, Nov. 2, 2012, 8 pgs.
Ginsburg et al. "Online Professional Development for Mathematics Teachers: A Strategic Analysis", [online]. Dated Jun. 2004. Retrieved from the Internet at URL:<http://www.nationaltechcenter.org/documents/opdpaperayeditsjune2004_000.doc>, on Oct. 1, 2012, 86 pgs.
International Preliminary Report on Patentability, PCT/US2011/035438, Oct. 31, 2011, 6 pgs.
International Search Report, PCT/US2013/039819, Aug. 30, 2013, 10 pgs.

* cited by examiner

PRESCRIPTION OF ELECTRONIC RESOURCES BASED ON OBSERVATIONAL ASSESSMENTS

CROSS-REFERENCE TO RELATED APPLICATIONS

This application claims the benefit under 35 U.S.C. §119 (e) of U.S. Provisional Application No. 61/523,156, entitled "Observation 360", filed on Aug. 12, 2011, Provisional Application No. 61/523,187, entitled "Student Assessment Data", filed on Aug. 12, 2011, and Provisional Application No. 61/654,813, entitled "Teacher Effectiveness Systems and Methods", filed on Jun. 2, 2012, the entire contents of each of which are incorporated herein by reference.

BACKGROUND

1. Technical Field

The present disclosure relates to professional development, and more particularly to the prescription of electronic resources based on observational assessments.

2. Description of Background Art

Some educational and professional systems have been migrating toward performance pay, which provides that a portion of a professional's compensation may be tied to performance. For example, under some educational systems, a teacher's compensation and advancement may be tied to student achievement in the classroom, which may directly or indirectly correspond to how that teacher is developing professionally. However, these systems can be limited in how to direct and manage professional development. For instance, they often lack the ability to conveniently identify and assign professional development activities that are relevant to the specific needs of their professionals. They also often lack the ability to reliably monitor whether their professionals are actively participating in the professional development activities that may have been assigned to them.

SUMMARY

According to one innovative aspect of the subject matter described in this disclosure, a system includes a communication unit for sending and receiving data, a recommendation engine, and an assignment engine. The recommendation engine receives observation data related to a target subject, identifies one or more electronic resources that correspond to the observation data, and provides data describing the one or more electronic resources for display to an observer. The recommendation engine is coupled to the communication unit to provide the data representing the one or more electronic resources. The assignment engine receives an assignment request requesting an assignment of at least one electronic resource from the one or more electronic resources to the target subject for completion. The assignment engine also assigns the at least one electronic resource to the target subject. The assignment engine is coupled to the communication unit to receive the assignment request.

In general, another innovative aspect of the subject matter described in this disclosure may be embodied in a method that includes receiving observation data related to a target subject; identifying, by one or more computing devices, one or more electronic resources that correspond to observation data related to the target subject; providing data describing the one or more electronic resources for display to an observer of the target subject; receiving an assignment request requesting an assignment of at least one electronic resource from the one or more electronic resources to the target subject for completion; and assigning, by the one or more computing devices, the at least one electronic resource to the target subject.

Other innovative aspects include corresponding systems, methods, apparatus, and computer program products.

It should be noted that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Example System

Figure 1:
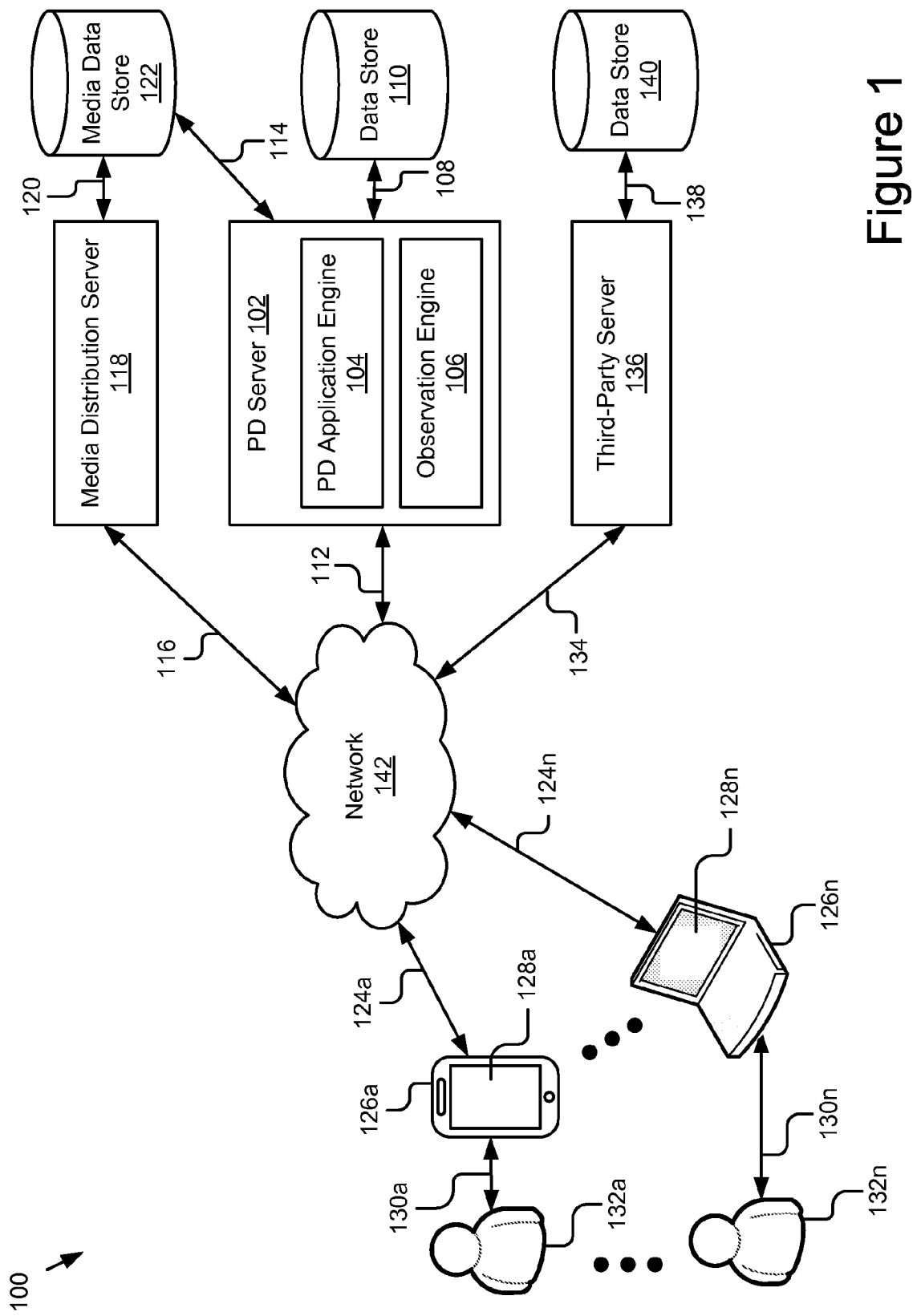
FIG. 1 is a block diagram illustrating an example system for prescribing electronic resources based on observational assessments.

FIG. 1 is a block diagram illustrating an example system 100 for prescribing electronic resources based on observational assessments. More particularly, the system 100 is capable, at least in part, of recommending electronic resources for prescription to a target subject being observed by an observer, providing the electronic resources for consumption by the target subject, monitoring and reporting on the consumption, and assessing the performance of the observer of the target subject based on the performance of the target subject.

In the depicted embodiment, the system 100 includes a professional development server 102, a media distribution server 118, client devices 126a ... 126n (also referred to herein individually and collectively as 126) that are accessed by users 132a ... 132n (also referred to herein individually and collectively as 132), and a third-party server 136. In the illustrated embodiment, these entities are communicatively coupled via a network 142. While only one network 142 is coupled to the professional development server 102, the media distribution server 118, the client devices 126a ... 126n, and the third-party server 136, in practice any number of networks 142 can be connected to these entities.

The professional development server 102 is a computing device or system for providing a professional development service. In the depicted embodiment, the professional development server 102 is coupled to the network 142 via signal line 112, and is coupled to a data store 110 and a media data store 122 via signal lines 108 and 114, respectively. The professional development server 102 may include one or more processors and one or more storage devices storing data or instructions for execution by the one or more processors. For example, the professional development server 102 may be a server, a server array or any other computing device, or group of computing devices, having data processing, storing and communication capabilities. The professional development server 102 may be a virtual server (i.e., a virtual machine) implemented via software. For example, the virtual server operates in a host server environment and accesses the physical hardware of the host server including, for example, a processor, memory, storage, network interfaces, etc., via an abstraction layer (e.g., a virtual machine manager). It should be understood that the professional development server 102 could be made up of any combination of devices and servers, or only one of device or server. The professional development server 102 may interact with the other entities 110, 118, 122, 126a ... 126n, and 136 of the system 100 via the network 142 or may be coupled to and interact with these entities via a direct data connection.

In some embodiments, the entities of the system 100 including the professional development server 102 and the media distribution server 118 may be implemented using cloud-based architectures where one or more computer functions are performed by remote computing systems and devices at the request of a local computer device. For example, a client device 126 may be a computing device having a limited set of hardware and/or software resources and may access hardware and/or software resources provided across the network 142 by other computer devices and resources, such as other client devices 126, the third-party server 136, the professional development server 102, or any other computing resources. The client device 126 may access these resources through a client application, such as a web browser or customized application, and the results of any computer functions or resources may be delivered through the client application 128 to the user of the client device 126, such as those described below with reference to FIG. 3. The professional development server 102 may be a cloud-based distributed computing system having dynamically scalable and virtualizable resources, and various functionality of the professional development server 102, the functionality of the professional development application engine 104, the observation engine 106, and/or the media distribution server 118 may be carried out and supplemented by computing systems and devices distributed over the network 142. Although only one professional development server 102 is shown, multiple servers 102 may be included in the system 100.

In FIG. 1, the professional development server 102 includes a professional development application engine 104 and an observation engine 106. The professional development application engine 104 is software including routines for providing network-based professional development training to professionals. Professional development training includes teaching skills to participants, assisting participants in integrating and applying those skills to their profession, assessing the success of participants in applying the skills, and evaluating whether additional training is necessary. By way of example, professional development training may be used to improve the skills of teachers and school administrators, health care professionals such as nurses or physicians, legal professionals such as lawyers, judges or trustees, corporate professionals such as officers, directors, managers or other internal corporate employees, travel industry professionals such as pilots, drivers, skippers or the like, educational professionals such as teachers or professors, financial professionals such as accountants, brokers, traders, tax specialists or the like, human relations professionals, sales professionals, service industry professionals, government employees, law enforcement personnel, military personnel, sports professionals and/or personnel, homeland security personnel, or any other workforce that requires professional training and assessment as to the assimilation and effectiveness of such training.

In some embodiments, the professional development application engine 104 may collect and store mapping information (i.e., social graphs) in the data store 110 mapping how all users 132 of the professional development service are associated. For example, the social graph of each user may describe that user's 122 relationships with other users 132, based at least in part on shared attributes, etc. In another example relating to education, all users 132 may be associated in their respective social graphs by school, school district, subject matter taught, amount of experience, etc. Users may also define their own connections and sets of users using functionality provided by the client application 128 in cooperation with the professional development application engine 104. For example, users 132 who met at a math conference may add one another to their social graph by using functionality provided by the client application 128 in cooperation with the professional development application engine 104. The professional development application 104 may also generate and maintain a user profile in the data store 110 for each user of the professional development service. A user profile is a collection of personal and professional data that is unique to a specific user. In some embodiments, the user profile is a digital representation of that person on the professional development service and includes a user's customized settings and preferences, biographical information, employment information, professional interests, employer information, professional development information, social graph information, etc.

In some embodiments, the professional development training may be provided by the professional development application engine 104 via the network 142 to teachers and administrators in an academic environment or other educational setting, such as a school district. The training or instruction may be provided by the professional development application engine 104 in the form of electronic resources.

An electronic resource may be any electronic media for conveying information. For example, an electronic resource can be instructional in nature, and can convey knowledge, information, and resources to a user who interacts with or views it. As a further example, an electronic resources may include an instructional audio or video segment, a publication, an interactive instructional reference, a lesson plan, a planning tool, a community forum, a sharing tool, an industry standard, a portfolio tool, a progress monitoring tool, a reporting tool, etc. In some embodiments, an electronic resource can include any of textural data, graphical data, video data, audio data, etc. For example, the electronic resource may be a webpage including one or more of text, graphics, video, audio, etc. In another example, the electronic resource may be or include a downloadable or streamable media object, including, for example, an electronic document (e.g., portable document format (PDF) document), electronic book (e-book), digital video, digital audio file, vector graphics file, etc. In these or other examples, the electronic resource may include a dataset/electronic file with text, graphics, video, audio, etc. embedded therein.

In some embodiments, these electronic resources may convey information on various topics, such as leadership training, teaching skills, and similar subjects of consequence and importance to the professional development of the users. For instance, an electronic resource may be an instructional video about an aspect of teaching, and a teacher may view the video by streaming it using his/her client device 126. In another example, the electronic resource may be a web-based interactive reference including text, audio, video, etc., and the teacher may study the reference by interacting with it via a client application 128 such as a web browser.

The observation engine 106 facilitates professional development based on observational assessments. In addition to its plain and ordinary meaning, an observational assessment is an assessment of, evaluation of, estimation of, determination of, judgment of, review of, rating of, comment on, suggestion about, etc., of one or more qualities of a target subject. The qualities assessed by an observational assessment may include, for example, the target subject's effectiveness, achievement, execution, compliance, value-add, improvement, deficiencies, weaknesses, etc. Hereinafter, these qualities are referred to collectively and individually as performance. An observational assessment is based on observations input by an observer of the target subject during an observation session, which may be an impromptu session or a planned session. In addition to its plain and ordinary meaning, an observation may be a qualitative or quantitative assessment of, evaluation of, estimation of, determination of, judgment of, review of, rating of, comment on, suggestion about, etc., one or more of the above-noted qualities of the target subject.

In some embodiments, an observational assessment may be informal assessment of the target subject. In other embodiments, the observational assessment may be a formal assessment of the target subject submitted to a human resources department or the like. The observer performing the observational assessment may be a supervisor, administrator, human resources personnel, coach, mentor, colleague, peer, etc., of the target subject, or may be unknown and/or unrelated to the target subject (e.g., an anonymous observer). For example, the observer may be an evaluator or reviewer for a business or organization, such as a school or school district.

In some embodiments, an observer interacting with the observation engine 106 via a client application 128 may provide observation data to the observation engine 106 reflecting his/her observations of a target subject, and in response, may receive recommendations of electronic resources that can be assigned to the target subject being observed by the observer. The observer interacting with the observation engine 106 may also assign one or more recommended electronic resources to the target subject for completion, and the target subject, upon accessing the professional development application engine 104 via an associated interface, may be presented with the electronic resource and/or options for interacting with the electronic resource. The observation engine 106 is discussed in further detail below with reference to at least FIG. 2.

The data stores 110 are 140 are information sources for storing and providing access to organized collections of data. In some embodiments, the data stores 110 and 140 are included in the memories (not shown) of the professional development server 102 and the third-party server 136, respectively. In other embodiments, the data stores 110 and 140 are included in a server or storage system distinct from but accessible by the professional development server 102 and the third-party server 136, respectively. In various embodiments, the data stores 110 and 140 store records, files, objects, etc., in cooperation with a file system executable by a processor. The data stores 110 and 140 may additionally or alternatively include a database management system (DBMS) executable by a processor to manage a collection of records, files, objects, etc. For example, the database could be a structured query language (SQL) DBMS. In these embodiments, the professional development server 102 and/or the third-party server 136 are respectively coupled to these databases via a bus or a network to store data in multi-dimensional tables having rows and columns, and manipulate, i.e., insert, query, update and/or delete, rows of data using programmatic operations (e.g., SQL queries and statements).

Additional structure and functionality of the professional development application engine 104, the observation engine 106, and the data store 110 are discussed in further detail below.

The media distribution server 118 is a computing device and/or system for transmitting electronic resources stored in the media data store 122 to the other entities of the system 100. In some embodiments, the media distribution server 118 cooperates with the professional development application engine 104 to provide an electronic resource to a user for consumption. For example, the professional development engine 104 may transmit a file (e.g., a webpage) to a client device for display to the user. The file may include code (e.g., a video player) executable to receive a video and/or audio stream (e.g., an electronic resource) from the media distribution server 118 and render it for display to the user. In other embodiments, the professional development server 102 performs the function of the media distribution server 118. In the depicted embodiment, the media distribution server 118 is coupled to the network 142 via signal line 122 for communication with the other entities of the system 100. The media distribution server 118 is also coupled to the media data store 122 to access electronic resources and other data stored in the media data store 122. In some embodiments, the media distribution server 118 is a hardware server including a processor, memory and network communication capabilities. In other embodiments, the media distribution server 118 is a virtual server.

In some embodiments, the media distribution server 118 transmits video and audio streams to one or more client devices 126. The video and audio streams may be live feeds or may be previously recorded, stored as media objects in the media data store 122, and transmitted to the one or more client devices 126 on demand, via delayed broadcast, etc. In some embodiments, the audio and video are streamed from the media distribution server 118 via the network 142. In other embodiments, a user can download an instance of the video and audio media objects from the media distribution server 118 to a local repository for storage and local playback.

The media distribution server 118 and/or the professional development server 102 is/are capable of transmitting any number of electronic resources to any number of client devices 126 simultaneously. While in the depicted embodiment, only one media distribution server 118 is depicted, any number of media distribution servers 118 and/or media data stores 122 may be included in the system. For example, the media distribution server 118 and the media data store 122 may be a distributed server and storage system with local instances strategically located in locations where spikes in demand for the electronic resources are likely to occur. For example, if a cluster of client devices 126 are located in a particular geographic region, local instances of the media distribution server 118 and the media data store may be coupled to the network 142 in that geographic region such that the media objects stored in the media data store 122 may be served locally and at a faster data rate to that cluster of client devices 126.

Figure 2:
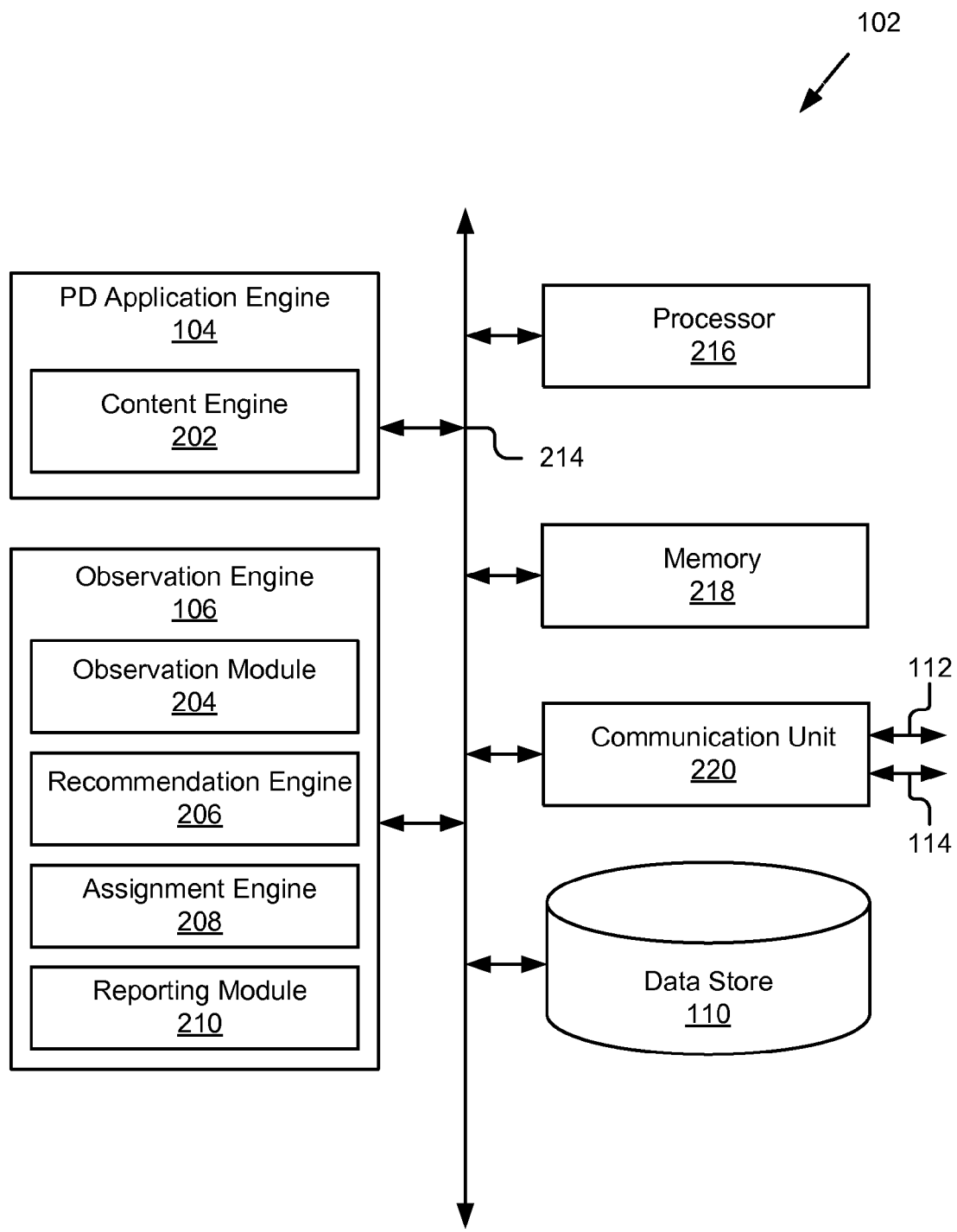
FIG. 2 is a block diagram illustrating an example professional development server.

It should be understood that, in some embodiments, the media distribution server 118 and/or the third-party server 136 have the same or similar architecture (e.g., memory, processor, communication unit, bus, etc.) as the professional development server 102 depicted in FIG. 2, and thus the description of those components applies to the media distribution server 118 and/or the third-party server 136.

The media data store 122 is an information source for storing data and providing access to stored data. The stored data may include the electronic resources described above, such as media objects including video, audio, vector-based files, electronic books, documents, etc. In some embodiments, the media data store 122 is included in the memory (not shown) of the media distribution server 118. In other embodiments the media data store is included in the memory 218 (see FIG. 2) of the professional development server 102. In yet other embodiments, the media data store 122 is included in a server or storage system distinct from but accessible by the media distribution server 116 and the professional development server 102. In some embodiments, the media data store 122 includes a database management system (DBMS) executable by a processor to manage a collection of records, files, and objects including the media objects. For example, the database could be a structured query language (SQL) DBMS. In these embodiments, the professional development server 102 and/or the media distribution server 118 are coupled to the database via the bus 214 to store data in multi-dimensional tables having rows and columns, and manipulate, i.e., insert, query, update and/or delete, rows of data using programmatic operations (e.g., SQL queries and statements).

The third-party server 136 is a server hosting a network-based software application operable to provide various services or functionalities, and to send data to and receive data from the professional development server 102, the media distribution server 118, and the client devices 126*a* . . . 126*n* via the network 142. In the depicted embodiment, the third-party server 136 is coupled to the network 142 via signal line 134 for communication with the other entities of the system 100. The third-party server 136 is also coupled to the data store 140 via signal line 138 for accessing and storing data. In some embodiments, the third-party server 136 is a server, server array or any other computing device, or group of computing devices, having data processing, storing and communication capabilities. In other embodiments, third-party server 136 is a virtual server.

The third-party server 136 can provide access to data stored in the data store 140 that is associated with users of the professional development application engine 104. In some embodiments, the data stored in the data store 140 may include demographics data, achievement data, student data, teacher data, standards data, inter-rater reliability data, etc., and the third-party server 136 may include a software application for providing secure access to this data to the professional development application engine 104 over the network 142 via an API. For example, in an educational setting, the demographics data may include instructor and pupil demographics data, and may be segmented across school district, school, classroom, grade, etc.; the achievement data may include standardized test scores for educators and pupils; the student data may include student assessments of teachers (e.g., aggregated from surveys, reviews, etc.), biographical data describing the students, social graph data (e.g., aggregated from third-party social networking services), etc.; the teacher data may include biographical data describing the teachers, social graph data (e.g., aggregated from third-party social networking services), teacher preferences, teacher assessments of students (e.g., aggregated from surveys, reviews, etc.), etc.; and the standards data may include standards compiled and approved by a governing organization or institution which define the levels of attainment pupils much reach to be considered acceptably educated. In some embodiments, a local instance of the data stored in the data store 140 may be included in the data store 110. For example, a batch program operating periodically (every few minutes, hours, days, weeks, etc.) may retrieve a refreshed version of the data stored in the data store 140 and store it in the data store 110.

The client devices 126*a* . . . 126*n* are computing devices having data processing and data communication capabilities. In the depicted embodiment, the client device 126*a* is coupled to the network 142 via signal line 124*a* and the user 132*a* interacts with the client device 126*a* as depicted by line 130*a*, and the client device 126*n* is coupled to the network 142 via signal line 124*n* and the user 132*n* interacts with the client device 126*n* as depicted by line 130*n*. While FIG. 1 illustrates two or more client devices 126, the present disclosure applies to any system architecture having one or more client devices.

The client devices 126 may include one or more wired or wireless network interfaces for sending and receiving network data; a graphics processor; a low or high-resolution touchscreen; a soft and/or physical keyboard; forward and rear facing cameras; sensors such as accelerometers and/or gyroscopes; a GPS receiver; a Bluetooth module; memory storing applicable firmware; and various physical connection interfaces (e.g., USB, HDMI, headset jack, etc.); etc. Additionally, an operating system for managing the hardware and resources of the client device 126, application programming interfaces (APIs) for providing applications access to the hardware and resources, a user interface module for generating and displaying interfaces for user interaction and input, and applications such as applications for making phone calls, video calls, video chatting, web browsing, messaging, social networking, gaming, capturing digital video and/or images, etc., may be stored and operable on the client device 126.

The client devices 126*a* . . . 126*n* may be computing devices of the same type or of different types. For example, the client device 126*a* may be a tablet computer and the client device 126*n* may be a laptop. In other examples, a client device 126 can be a computing device such as a workstation computer, a desktop computer, a netbook computer, a smartphone, a set-top box/unit, an Internet Protocol-connected smart TV or projector including a computer processor capable of receiving viewer input, accessing video content on computer networks such as the Internet, and executing software routines to provide enhanced functionality and interactivity to viewers, or the like. In some embodiments, the client device 126 is a handheld wireless computing device, which is capable of sending and receiving voice and/or data communications. For example, the client device 126 may include a processor, a memory, a power source and one or more network interfaces coupled via a data bus, where the one or more network interfaces broadcast and receive control data, voice data, and/or network data via radio signals.

In the depicted embodiment, the client device 126*a* contains a client application 128 for generating and displaying user interfaces, receiving user input, and sending data to and receiving data from the other entities 102, 118, 136, etc. of the system 100. In particular, the client application 128 may include routines for accessing the functionality and content of the professional development server 102 and/or the media distribution server 118. In some embodiments, different client devices 126 may include different client applications 128. For example, the client device 126a may include a client application 128a customized for interaction with the professional development server 102 and/or the media distribution server 118, and the client device 126b may include a client application 128b operable as a web browser for accessing webpages and other web-based resources served by other entities of the system 100 such as the professional development server 102. In other embodiments, the client devices 126 may include the same client applications 128.

Additional structure and functionality of the client devices 126 and the client application 128 are provided below with reference to at least FIG. 3.

The network 142 includes one or more wired or wireless networks and may have any number of configurations such as a star configuration, token ring configuration or other known configurations. The network 142 may include a local area network (LAN), a wide area network (WAN) (e.g., the Internet), and/or any other interconnected data path across which multiple devices may communicate. The network 142 may be coupled to or include mobile (cellular) networks including distributed radio networks and a hub providing a wireless wide area network (WWAN), or other telecommunications networks. In some embodiments, the network 142 may include Bluetooth communication networks for sending and receiving data. The network 142 may transmit data using a variety of different communication protocols including user datagram protocol (UDP), transmission control protocol (TCP), hypertext transfer protocol (HTTP), hypertext transfer protocol secure (HTTPS), file transfer protocol (FTP), direct data connection, wireless access protocol (WAP), various email protocols, etc. Client devices 126 may couple to and communicate via the network 142 using a wireless and/or wired connection. In some embodiments, the communication unit (not shown) of the client devices 126 include a wireless network interface controller for sending and receiving data packets to an access point of the network 142. For example, the client devices 126 may be Wi-Fi enabled devices that connect to wireless local area networks (WLANs), such as wireless hotspots. The client devices 126 may also include one or more wireless mobile network interface controllers for sending and receiving data packets via a WWAN of the network 142.

Example Professional Development Server 102

FIG. 2 is a block diagram of an example professional development server 102. In the depicted embodiment, the professional development server 102 is a computing device that includes a professional development application engine 104 and an observation engine 106. The professional development server 102 also includes a processor 216, a memory 218, a communication unit 220, and a data store 110 communicatively coupled via a communication bus 214. The bus 214 can be any type of conventional communication bus for transferring data between components of a computing device, or between computing devices. The professional development server 102 depicted in FIG. 2 is provided by way of example and it should be understood that the professional development server 102 may take other forms and include additional or fewer components without departing from the scope of the present disclosure. For example, while not shown, in some implementations, the professional development server 102 may include input and output devices (e.g., a computer display, a keyboard and mouse, etc.). Additionally, it should be understood that the computer architecture depicted in FIG. 2 is applicable to the other entities of the system 100, such as the media distribution server 118 and/or the third-party server 136 with various modifications.

The processor 216 includes an arithmetic logic unit, a microprocessor, a general purpose controller, or some other processor array to perform computations and provide electronic display signals to a display device (not shown). The processor 216 may be coupled to the bus 214 for communication with the other components of the professional development server 102. The processor 216 may process data signals and may have various computing architectures including a complex instruction set computer (CISC) architecture, a reduced instruction set computer (RISC) architecture, or an architecture implementing a combination of instruction sets. Although only a single processor 216 is shown in FIG. 2, multiple processors may be included. The processor 216 may be capable of supporting the display of images and the capture and transmission of images, perform complex tasks, including various types of feature extraction and sampling, etc. It should be understood that the professional development server 102 could include various operating systems, sensors, displays, additional processors, and other physical configurations.

The memory 218 stores instructions and/or data that may be executed by the processor 216. The memory 218 is coupled to the bus 214 for communication with the processor 216 and the other components of professional development server 102. The instructions and/or data may comprise code for performing any and/or all of the techniques described herein. In particular, the memory 218 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 216. A non-transitory computer-usable storage medium may include any and/or all non-transitory computer-usable storage media. In some implementations, the memory 218 may include volatile memory, non-volatile memory, or both. For example, the memory 218 may include a dynamic random access memory (DRAM) device, a static random access memory (SRAM) device, flash memory, a hard disk drive, a floppy disk drive, a CD ROM device, a DVD ROM device, a DVD RAM device, a DVD RW device, a Blue-Ray™ storage device, a flash memory device, or any other mass storage device known for storing information on a more permanent basis. It should be understood that the memory 218 may be a single device or may include multiple types of devices and configurations.

The communication unit 220 is an interface for sending to and receiving data from other computing devices. In the depicted embodiment, the communication unit 220 is coupled to the network 142 by the signal line 112 and coupled to the bus 214. In some embodiments, the communication unit 220 includes a network interface device (I/F) having ports for wired connectivity. For example, the communication unit 220 includes a CAT-5/6/7 interface, USB interface, or SD interface, etc. The communication unit 220 may also include a transceiver for sending and receiving signals using Wi-Fi, Bluetooth® or cellular communications for wireless communication. The communication unit 220 can link the processor 216 to the network 142 that may in turn be coupled to other processing systems. The communication unit 220 can provide connections to the network 142 and to other entities of the system 100 using standard communication protocols including, for example, TCP/IP, HTTP, HTTPS, etc.

Example Professional Development Application Engine 104

The professional development application engine 104 includes a content engine 202, which is coupled for communication with the other components 106, 110, 204, 206, 208, 210, 216, 218, and 220 of the professional development server 102. The content engine 202 is also coupled to the network 142 via the communication unit 220 for communication with the other entities 118, 122, 126a ... 126n, 136, and 140 of the system 100.

In some embodiments, the professional development application engine 104 and/or the content engine 202 are sets of instructions executable by the processor 216 to provide their respective functionality. In other embodiments, the professional development application engine 104 and/or the content engine 202 are stored in the memory 218 of the professional development server 102 and are accessible and executable by the processor 216 to provide their respective functionality. In any of these embodiments, the professional development application engine 104 and the content engine 202 may be adapted for cooperation and communication with the processor 216 and other components 106, 110, 204, 206, 208, 210, 216, 218, and 220 of the professional development server 102.

The content engine 202 is software including routines for managing and providing content for the professional development service. In some embodiments, the content engine 202 catalogs the electronic resources, provides for the addition or removal of electronic resources, transmits the electronic resources to the users of the professional development service for consumption, tracks user consumption and interaction with the of electronic resources, etc.

The content engine 202 is coupled to the data store 110 and the media data store 122, either directly or via the media distribution server 118, to access the electronic resources stored therein. In some embodiments, the content engine 202 can search the data store 110 and the media data store 122 to generate and collect information about the electronic resources. For instance, the content engine 202 can aggregate attributes of the electronic resources, such as the author, publisher, file size, creation date, publication date, a thumbnail of the resource, etc., and store them in a resource library database. In various embodiments, the content engine 202 can access the electronic resources in the data store 110 and the media data store 122 to transmit or stream copies of those resources to the client devices 126 of the users 132 requesting to interact with them.

The content engine 202 can also receive and store new electronic resources in the media data store 122 or the data store 110. In some embodiments, the content engine 202 may interact with the media distribution server 118 to store information in the media data store 122. In other embodiments, the content engine 202 may store information in the media data store 122 directly. In some embodiments, the content engine 202 receives content addition requests via the network 142, requesting the addition of electronic resources to the professional development service. For example, the content engine 202 is capable of serving a webpage to a client device 126 that provides functionality for the user of the client device 126 to author or upload an electronic resource along with metadata characterizing it. The electronic resource may be an interactive electronic book, a video file, an audio file, a document, a dataset, an electronic link, or any other electronic resource that can be accessed and viewed via the professional development service. The content engine 202 may receive the additional electronic resource, store the metadata about the resource in the resource library database, and store the electronic resource in the data store 110 and/or media data store 122. Thus, the content engine 202 can update the resource library database, either periodically or real-time, with any new electronic resources that have been added to or removed from the professional development service.

The content engine 202 is capable of receiving requests for electronic resources from users 132 and fulfilling those requests by transmitting the electronic resources to the corresponding client devices 126 of the users 132. For example, the content engine 202 may receive a request from a client device 126 of a user 132 via the network 142 to view a training video that was assigned to the user 132 by an observer while observing that user 132 in action. In another example, upon logging in to the professional development service, a user 126 may be presented with an interface by the user application 128 that shows any outstanding assignments that the user 132 must complete, the dates by the assignments must be completed, a description of what the assignments are, etc. Using this interface, the user may select an assignment, in response to which the user application 128 transmits a request to the content engine 202 for the electronic resource associated with the assignment. In yet another example, an observer, upon logging in, may be provided with electronic resources (e.g., video, audio, etc.) by the content engine 202 in cooperation with the client application 128, which describes what to focus on, observe, evaluate, during an upcoming/pending observational assessment of a target subject. In these or other examples, electronic resources can be identified and served to the users based on the users' social graphs and/or preferences. The content engine 202, upon receiving this request, may locate the electronic resource in the data store 110 and provide it to the user application 128 via the network 142 for presentation to the user 132. As discussed elsewhere herein, the content engine 202 may, in some embodiments, cooperate with the media distribution server 118 to provide the electronic resources for consumption and/or interaction by the users 132 requesting them.

When users consume or interact with the electronic resources provided by the content engine 202, the content engine 202 is capable of logging the consumption and interaction in the data store 110 in association with those users. In some embodiments, the content engine 202 cooperates with the user application 128 to monitoring user interactions with the electronic resources. For example, when user interacts with a user interface generated and displayed by the user application, the user application 128 sends interaction data via the network 142 to the content engine 202 informing the content engine 202 of the interaction, and the content engine 202 stores this interaction data. In a further example, if a user interacts with a media player embedded in a user interface of the user application 128, interaction data describing the user's interactions, such which actions the user took (e.g., clicked a pause button, a play button, a scrubbing dial, volume dial; maximized the viewing field of the media player; added a comment about the video using an associated interface element; etc.) are sent by the user application 128 to the content engine 202 and the content engine 202 logs those interactions. The interaction data may also include or be associated with data identifying which electronic resource was interacted with, the user who interacted with the resource, the time and date of the interaction, etc. In another example, if a user is accessing an interactive electronic book, the user application can send interaction data describing when the user begins interacting with the electronic book, pages through the electronic book, downloads files included with or embedded in the electronic book, completes surveys included with the electronic book, views videos embedded in the electronic book, comments on passages of the electronic book, or otherwise uses any other functionality provided by the user application 128 for interaction with the electronic book or the corresponding components of the professional development application engine 104.

In some embodiments, the content engine 202 may provide the electronic resource to the client devices 126 with presentational information and the client application 128 may use the presentational information to form the look and feel of the user interfaces. For example, the electronic file(s) or data stream(s) may be formatted using a markup language (e.g., HTML, XML, etc.), style sheets (e.g., CSS, XSL, etc.), graphics, and/or scripts (e.g., JavaScript, ActionScript, etc.), and the client application 128 may interpret the interface instructions and render an interactive Web User Interface (WUI) for display on a user device 116 based thereon. In other implementations, the client application 128 may determine the formatting and look and feel of the user interfaces independently. Using the user interfaces presented by the client application 128, the user can input commands selecting various actions.

Example Observation Engine 106

The observation engine 106 is software including routines for facilitating professional development based on observational assessments. In particular, the observation engine 106 can send, receive and store observation-related data, such as observation data, templates and files including questions and answers tied to performance standards (e.g., standards related to execution, compliance, effectiveness, personalized learning plans, etc.), identify and suggest electronic training resources based on observation-related data received, generate reports including analytics about the professionals and their progress, generate performance (e.g., execution, evaluation, compliance, effectiveness, etc.) assessments of the observers of the professionals based on demographics data, observation-related data, achievement data, standards data, student data, teacher data, interaction data, inter-rater reliability data, observer comparison data, or any other data described herein.

In the depicted embodiment, the observation engine 106 includes an observation module 204, a recommendation engine 206, an assignment engine 208, and a reporting module 210. The components 204, 206, 208, and 210 of the observation engine 106 are coupled for communication with each other and the other components 104, 110, 202, 216, 218, and 220 of the professional development server 102. The components 204, 206, 208, and 210 are also coupled to the network 142 via the communication unit 220 for communication with the other entities of the system 100.

In some embodiments, the observation engine 106, the observation module 204, the recommendation engine 206, the assignment engine 208, and/or the reporting module 210 are sets of instructions executable by the processor 216 to provide their respective functionality. In other embodiments, the observation engine 106, the observation module 204, the recommendation engine 206, the assignment engine 208, and/or the reporting module 210 are stored in the memory 218 of the professional development server 102 and are accessible and executable by the processor 216 to provide their respective functionality. In any of these embodiments, the observation engine 106, the observation module 204, the recommendation engine 206, the assignment engine 208, and/or the reporting module 210 may be adapted for cooperation and communication with the processor 216 and other components 104, 110, 202, 216, 218, and 220 of the professional development server 102.

The observation module 204 is software including routines for sending, receiving, processing, and storing observation-related data. In some embodiments, the observation module 204 may provide observation templates to observers for use in observing and assessing other users (also referred to as the target subjects), receive observation files including observation data reflecting the assessments, and store the observation files in the data store 110 in association with the target subjects being observed. In some embodiments, the observation module 204 interacts and cooperates with the client application 128 to provide the above-noted functionality.

In the depicted embodiment, the observation module 204 is coupled to one or more client devices 126 to provide one or more observation templates to the client devices 126 and to receive observation-related data from the client devices 126. In some embodiments, an observation template is an electronic form for assessing the performance of a target subject. The observation template may include header fields for describing the circumstances of an observation session. For example, the observation template may include fields for describing the identity a target subject, the date the observation was performed by an observer, and how the results of the observation should be distributed and stored, etc. Additionally or alternatively, the observation template may include assessment fields for describing the performance (e.g., execution, compliance, effectiveness, and/or other qualities) of the target subject during the observation, data about prior observational assessments of the target subject, data about other observers, etc. In some embodiments, the assessment fields may include data describing predefined questions and user-selectable or user-definable answers; fields for user-definable questions and/or answers; comment fields for providing a description of the target subject; rubrics, etc. In these or other embodiments, the assessment fields may state a goal, objective, effectiveness expectation, or other metric, and include one or more indicators assessing how the target subject is meeting that goal, objective, effectiveness expectation, or other metric. For example, the objective might be "administrators develop the vision, mission, values, beliefs and goals of the organization, collaboratively determining the processes used to establish these attributes, and facilitating their integration into the life of the organization community," and the selectable indicators assessing whether the administrator is partially proficient at meeting this goal may state that the vision, mission and values are: "developed through collaborative process," "publically available," part of routine," and "routinely updated" by the target subject (i.e., the administrator). In this example, if only some of these indicators are met, then the target subject is deemed partially proficient at the goal. If all are met, additional indicators evaluating whether a target subject is proficient, accomplished, or exemplary at meeting this goal are considered and selected if appropriate. The observation templates may also include assignment fields for recommending, assigning and/or integrating electronic resources (e.g., video); and fields for defining assignment parameters for the electronic resources (e.g., task timers, wait times, etc.), as described in further detail below. In some embodiments, suggestions for the assignment fields may be populated real-time by the assignment engine 208 in response to the sending of observation data.

The content of the observation templates may be displayed to users via user interfaces generated and displayed by the client application 128. The user interfaces displaying the content of an observation template to a user may also provide functionality for completing the various fields of the template. For example, while observing a target subject in the field, an observer user 132 may interact with interface elements presented by the client application 128 to input information about the circumstances of the observation and the target subject's performance. For example, the observer user 132 may input the location where the observation session took place; the date and time of the observation session; the identity of the target subject's audience; information about the identity of the observer; information about the observer's position and/or relationship to the target subject; options for storing and distributing the results of the observation; etc. The observer user 132 may also provide input describing the performance of the target subject, such as inputting answers to questions about various aspects of the target subjects performance, etc.

In some embodiments, an observation template may include predefined questions and answers for assessing the compliance of a target subjects with various predetermined requirements. For example, the requirements may be based on institutional policy, compliance with requirements, legislated practices, or an industry standard, and the questions may be directed to whether or not a target subject is meeting those requirements/standards. In these embodiments, the same template may be used repeatedly by an observer to record his/her observations of a target subject over time or of a number of different target subjects. In other embodiments, various different templates may be used for the observational assessments of a target subject. The structure and content of the observation templates, or portions thereof, may be user-defined or may be automatically generated by the observation module 204 using standards data stored in the data store 110 or received from another entity of the system 100, such as the third-party server 136.

The client application 128 may transmit observation-related data including input provided by the observer during the assessment of the target subject to the observation module 204 for storage. For example, the observer may instruct the client application 128 to save a completed observation template as an observation file in a local repository, and then transmit it to the observation module 204 via the network 142 for storage in the data store 110. The observation file includes the information from the template upon which it is based along with the observations (e.g., evaluations, ratings, compliance assessments, and comments), assignments, and/or other information input by observer during the observation.

In the depicted embodiment, the observation module 204 is coupled via the bus 214 to the data store 110 to store and retrieve observation-related data. For example, the observation module 204 can store and retrieve the observation templates and the observation files received from the client application 128. The observation module 204 can also store, retrieve, and provide organization information associated with observers and target subjects. For example, in an educational setting, the observation module 204 may access information associated with the organization of the school districts of a state or region; a school district; the schools of a school district; the teachers and administrators of a school district, a school, a subject, etc.; the classes in a district or school; the students of a school district, a school, a class, a subject, a teacher, an administrator, etc., from the data store 110.

The recommendation engine 206 is software including routines for receiving observation data related to a target subject, identifying one or more electronic resources that correspond to the observation data, and for providing data representing the one or more electronic resources for display. In some embodiments, the recommendation engine 206 is coupled via the network 142 to receive observation data from one or more client devices 126. The observation data may characterize one or more aspects of a target subject's performance during an observation session performed by an observer. In the depicted embodiment, the recommendation engine 206 is coupled to the data store 110 via the bus 214 to store and retrieve data, and is coupled to the media data store 122 either directly via signal line 114 or indirectly via signal line 110 and the network 142 to store and retrieve data.

In some embodiments, the observation data may accompany a resource request for a list of electronic resources that correspond to the observation data. The recommendation engine 206 may receive the request from a client device 126, and may satisfy the request by identifying one or more electronic resources that correspond to the request, and provide a resource response including a summary of the one or more resources to the client device 128 for display to the user 132 of the client device 128. For example, an observer of a target subject may provide input reflecting observation data assessing the performance of the target subject, and the client application 128, upon receiving that input, may transmit a request for recommended electronic instructional resources that can be assigned by the observer to the target subject to help the target subject improve his or her skills in a given area.

In some embodiments, to identify one or more electronic resources that correspond to the observation data accompanying the resource request, the recommendation engine 206 can compare the observation data to metadata associated with electronic resources to identify resources that match the observation data. For example, the recommendation engine 206 can search a resource library database that includes an index or catalog of the electronic resources that are available. For instance, the resource library database can include metadata for each of the electronic resources describing each resource. The metadata can include tags describing various characteristics of an electronic resource, a graphical image of the resource (e.g., a thumbnail), a description of the topic or subject matter that the resources is directed to, an author or authors of the resource, the publisher of the resource, the popularity of the resource including, for example, the number of users who have consumed the resource and the level of their interactivity with the resource, etc. The recommendation engine 206 can query the resource library database using the observation data or aspects thereof to identify resources that have corresponding metadata that match the observation data, either loosely or strictly.

The electronic resources may be distributed among several data stores located across the network 142 or may be stored in a single data store. In the depicted embodiment, the media data store 122 and the data store 110 work cooperatively to store the electronic resources. For example, media objects such as video, audio, e-books, vector-based files, documents, datasets, learning objects, etc., may be stored in the media data store 122 and lesson plans, learning progressions, curriculum maps, publications, portfolios, industry standards, etc., may be stored in the data store 110. In other embodiments, all of the electronic resources may be stored in and accessible from a single information source, such as the media data store 122, the data store 110, etc. In any of the foregoing embodiments, the resources stored in the data store may be cataloged, for example, by the content engine 202, in a single resource library database or in resource library databases distributed over the network 122, and the recommendation engine 206 can query the resource library database or resource library databases for information matching various criteria or for information about the resources. In other embodiments, the electronic resources may be prescribed or predetermined in advance and pushed out by the professional development server 102 to the observer of a target subject for assignment or to the target subject directly for consumption.

In some embodiments, the observation data includes data quantifying an observer's assessment of a target subject's performance. For example, the observation data may include an answer input by an observer in response to a question about the target subject's performance in a particular area, and the answer may quantify how well a target subject is performing.

In some embodiments, the answers to questions may be based on predefined performance scales that are defined to the recommendation engine 206 and the recommendation engine 206 may use the answer to determine where the target subject lies within that performance scale. For example, a target subject's performance in a particular area may be assessed from worst to best using the following identifiers: "unsatisfactory," "needs improvement," "developing," "proficient," and "distinguished," and if the observation data includes data identifying "unsatisfactory" as the answer to a particular question about a target subject's performance in that area, the recommendation engine 206 may use this assessment to identify one or more electronic resources that provide foundational training in that area.

If multiple electronic resources are identified by the recommendation engine 206 as corresponding to the observation data, the recommendation engine 206 can rank them based on one or more criteria. A criterion may be any attribute associated with the electronic resources. For example, the criterion may include a topic; the number of times an electronic resource has been interacted with, viewed, listened to, etc.; an author; a publisher; a date of the electronic resource; the number of users connected to the target subject in the social graph who have interacted with the electronic resource; the number of times an electronic resource has been assigned to users having a similar assessment; etc. The recommendation engine 206 can generate the summary of electronic resources based on the ranking performed by it. For example, the top-ranked electronic resource may be listed first in the summary and the lowest-ranked resource may be listed last. In another example, the recommendation engine 206 may limit the summary to a certain number of top-ranked resources. In yet another example, the list of electronic resources may be sorted in order of rank and provided incrementally as needed by the user application 128. In a further example, the recommendation engine 206 may rank the resources by those that have been most impactful/effective for subjects similar to the target subject. For example, the recommendation engine 206 may use demographics, observation, achievement, interaction, standards, student, and/or teacher data, etc. to identify the resources that were the most effective at helping a set of similar target subjects develop professionally. For example, a target subject may be a fourth grade teacher who is struggling with maintaining order in the classroom. The recommendation engine 206, using demographic data and/or profile data, may identify other fourth grade teachers who, based on their respective observation data and/or achievement data, also initially struggled with maintaining order in their classrooms and who later became proficient at maintaining order in their classrooms, as reflected by their respective observation data and/or achievement data, by watching a training video(s) on classroom management; and the recommendation engine 206 and may recommend this/these videos for assignment/consumption.

The assignment engine 208 is software including routines for receiving an assignment request requesting an assignment of one or more electronic resources to the target subject for completion, and for assigning the one or more electronic resources to the target subject based at least in part on the assignment request. In some embodiments, the assignment engine 208 is coupled via the network 142 to receive the assignment request from one or more client devices 126.

The assignment engine 208 may interact with the client application 128 to assign various electronic resources to a target subject. For example, during an observation of the target subject, the observer inputs observational data indicating that the target subject is in need of training on a particular skillset, and the recommendation engine 206 provides a summary of electronic instructional/training resources that are accessible via the professional development service hosted by the professional development application server 104. The observer, using an interface rendered and displayed by the user application 128, may assign one or more of the electronic resources to the target subject. In response to the assignment, the assignment unit 304 of the user application 128 generates and sends and assignment request to the assignment engine 208, which identifies the electronic resource or resources that have been assigned, as further discussed below with reference to at least FIG. 3. The assignment engine 208 then records the assignment of the electronic resources in the data store 110 in association with a user profile for the target subject. In some embodiments, an assignment is not activated by the assignment engine 208 until the corresponding observation file including the assignment is finalized and uploaded by the observation unit 302 of the client application 128. In other embodiments, one or more assignment requests are provided and recorded by virtue of the observation file being uploaded for storage by the client application 128 to the professional development server 102. For example, upon receipt of the observation file, the assignment engine 208 extracts any assignments from the observation file and records them as described above. In some embodiments, to complete the assignment, the target subject, who is a user of the professional development service, may be required to access the service and interact with the electronic resource, for example, as discussed above with respect to the content engine 202. In other embodiments, to complete the assignment, the target subject may be required to consume the electronic resource and then report on his/her implementation of the training provided by the resource and/or provide his/her reflections on the training provided by the resource, etc., via the client application 128. For example, the target subject may be required to submit, via the client application 128, input describing his/her experience with trying-out/implementing the principles taught by the assigned resource (e.g., an online training video). Once this input has been received, the assignment engine 208 may flag the assignment as being completed in the data store 110. Other configurations for completing an assignment are also contemplated.

In some embodiments, the assignment request includes one or more assignment parameters. Each assignment parameter sets a condition that must be met in order to complete the assignment. For example, an assignment parameter includes a due date, a level of interaction with the electronic resource that is required to complete the assignment, an additional requirement that must be satisfied for completion of the assignment, etc. For instance, the observer may assign a video to the target subject to view and may require the target subject to write his/her thoughts or reflections about the video by inputting and transmitting them via an interface associated with the professional development service. In the depicted embodiment, the assignment engine 208 is coupled to the data store 110 via the bus 214 to store the one or more assignment parameters in association with assignment to which they pertain. In these or other embodiments, one or more assignment parameters can be predefined and stored in the data store 110. A predefined assignment parameter can be applicable to all users who are assigned electronic resources, or may be customized for a particular group of users, such as those belonging to a particular organization or being observed by a particular observer. For example, for all videos that are assigned, a predefined assignment parameter can be set (e.g., by an observer via an associated interface of the professional development service) requiring that the videos must be viewed to completion in order for the assignments of those videos to be considered satisfied. In another example, predefined assignment parameters can require videos to be viewed to completion in full screen mode with the sound of the video being set at an audible level in order for the assignments for the videos to be considered satisfied.

In some embodiments, the assignment engine 208 generates and sends an electronic notification to the users associated with the assignment request. For example, the assignment engine 208 may send an email to the target subject and/or the observer(s) summarizing the assignment. The email may include a description of the electronic resource and an electronic link (e.g., a hyperlink including the uniform resource locator (URL) of the electronic resource) for directing the reader directly to the electronic resource. The email may also describe any assignment parameters, such as when the assignment must be completed by. In another example, the assignment engine 208 may send a similar message to the user via an internal messaging system, an instant messaging system, a text messaging system, or any other electronic messaging system. In these embodiments, the assignment engine 208 is coupled to the data store 110 to access information about the electronic resource and to store a copy of the electronic notification that was sent.

The reporting module 210 is software including routines for generating and sending reports. The reporting module 210 may use the data stored/and or aggregated by the professional development server 102 such as achievement data, demographics data, student data, teacher data, observation-related data, interaction data, standards data, or any other data described herein, to generate the reports. For example, the reporting module 210, using the data aggregated and stored by the observation engine 106 and/or professional development application engine 104, may generate/segment/organize a report by region, district, school, class, teacher, student(s), class-size, gender, ethnicity, public policy, legislation, standards, requirements, etc. In a further example, the reporting module 210 may process this data to make macro and/or micro qualitative assessments for inclusion in one or more reports. For instance, the reporting module 210, based on the observation-related data, demographics data, achievement data, student data, teacher data, interaction data, and/or standards data, etc., may generate an aggregate effectiveness score for a region, body, or group, and/or individual effectiveness scores for each of the teachers of that region, body, or group. The reports may be generated by the reporting module 210 to include any type of data including textual, graphical, video, audio, and vector-based data to provide rich, qualitative and quantitative analysis of the target subject(s), observer(s), and associated organization(s) or businesses(s), including their performance (e.g., execution, effectiveness, compliance, problem-areas, etc.).

In some embodiments, the reporting module 210 may analyze two or more data types, such as observation-related data, achievement data, and/or student data related to the target subject, to generate an effectiveness rating for that target subject. Analyzing two more data types to generate an effectiveness rating is advantageous as it can provide a more reliable effectiveness rating for a target subject compared to an effectiveness rating generated from a single data type. For instance, the observation data for a given teacher may reflect, for a particular evaluation period, that the teacher received a rating of "proficient" for four of the metrics evaluated and a "needs improvement" rating for three of the metrics. However, during this same evaluation period, the student data may reflect that the students of this teacher gave the teacher a "proficient" or "excellent" rating in every category surveyed, and the achievement data for these students may reflect standardized test scores, which meet or exceed legislative requirements. As a result, the effectiveness rating generated by the reporting module 210 can balance the "needs improvement" ratings against the positive survey and test score results to produce a more accurate overall "effectiveness" rating for the teacher. In other examples, the reporting module 210 may determine the assessments of the target subject described by each data type as being consistent, and as providing further evidence/support for a particular effectiveness rating.

In some embodiments, the reporting module 210 can generate a report based at least in part on the receipt of interaction data describing an interaction between the target subject and the at least one electronic resource that was assigned. The reporting module 210 may be coupled to the content engine 202, the memory 218, and/or the data store 110 to receive the interaction data. For example, to generate a report, the reporting module 210 may analyze user behavior in interacting with one or more electronic resources provided by the professional development application engine 104, and generate a report summarizing and/or detailing this analysis. In particular, when a user consumes an electronic resource, the content engine 202 of the professional development application engine 104 may receive and store interaction data describing the interaction in the data store 110 in association with a user profile associated of the user, and the reporting module 210 may access the interaction data to analyze the user interaction and generate a report describing the user interaction.

For example, when a user accesses an electronic resource, pages through an electronic book, downloads files included with or embedded in a webpage, complete a survey associated with any electronic resource, views a video file, listens to an audio file, comments on passages of an interactive electronic book, submits lesson plans, submits curriculum maps, downloads documents, uploads files including video, audio, text, graphics, etc., participates in communities, groups defined by his/her social graph, or otherwise uses any other functionality provided by the client application 128 (e.g., see FIG. 3) to interact with an electronic resource, the professional development application engine 104 receives interaction data describing these interactions from the client application 128 or another entity of the system, such as the media distribution server 118, and stores interaction data describing the interaction in the data store 228. In another example, if an observer assigns a target subject to watch a video on achieving effective classroom management via the professional development service, the reporting module 210 can generate status updates about the target subject's progress on watching the video and send them to the observer. The reporting module 210 can also report on the target subject's additional efforts to develop his/her skills by reporting on what other electronic training resources the target subject has consumed since the observer made the assignment, provided the target subject provides his/her consent for doing so via an associated privacy settings interface.

In some embodiments, the reporting module 210 generates a report in response to receiving a trigger signal. In some embodiments, the trigger signal may be generated by the professional development application engine 104 upon the completion of an assignment by a target user and transmitted to the reporting module 210. In other embodiments, the trigger signal may be generated in response to a request for a report, for example, from a user of the professional development service via an associated user interface. For example, an observer who observed a target subject and assigned the target subject one or more electronic resources may input a command into his/her user device 118 via the user application 128 commanding that a report be generated describing the target subject's progress on completing the assignment. Responsive to receiving the command, the user application 128 may generate and send a report request via the network 110 to the reporting module 210, thus triggering the reporting module 210 to generate and send the report for display to the target subject, observer, an administrator, a combination of the foregoing, etc.

In other embodiments, the reporting module 210 may automatically generate the report at certain intervals, times, etc. For example, the reporting module 210 may automatically generate reports for all outstanding assignments and send them to the administrator and/or observer users 132 who oversee the target subjects that the outstanding assignments correspond to. In some embodiments, the reporting module 210 may transmit the report to the user application 128 for display to the user 132, provide the report for download as a portable document, transmit the report via electronic message (e.g., via email) to one or more other users 132 associated with or responsible for the target subject, etc.

The reporting module 210 is also capable of analyzing the effectiveness of an observer, and generating and providing a report describing the observer's effectiveness to the observer and other users 132, such as an administrator of the observer. In some embodiments, to analyze the effectiveness of the observer, the reporting module 210 compares achievement data and observation-related data associated with the target subject to determine if the performance assessment of the target subject reflected by the observation-related is accurate and consistent. The achievement data can include any type of achievement data associated with the target subject. For example, depending on the target subject's profession, the achievement data may include test scores for one or more pupils of the target subject, test scores for the target subject, reviews by peers, performance reviews, sales figures associated with the target subject, reviews by clients of the target subject, compliance with requirements/standards, etc. The observation data can include any data associated with the performance assessments made by an observer, such as the observation files associated with the observer and/or target subject(s) observed by the observer. In these or other embodiments, the reporting module 210 can track the observational assessments performed by an observer and compare them for consistency based on substance, frequency, etc.

Based on the observation-related and achievement data, the reporting module 210 can determine the accuracy and consistency of a performance assessment (e.g., execution, effectiveness, compliance, performance, trending, and other metrics, etc.) of the target subject. In some embodiments, the reporting module 210 can analyze the achievement data to determine an achievement-based performance assessment for the target subject; can analyze the observation-related to determine an observation-based performance assessment for the target subject; and compare the achievement-based and the observation-based performance assessments to further determine if the observation-based performance assessment of the target subject is accurate/consistent. In other embodiments, the reporting module 210 may compare the observational assessments by one observer of a target subject to the observational assessments of the same target subject by other observers to determine the accuracy of the observer's assessments. For example, if an observational assessment of a target subject by a first observer is grossly inconsistent with the observational assessments of that target subject by other observers on the same or similar subject matter, the observational assessment of the first observer may be flagged and reported to an administrator of the observer for further review/scrutiny.

In some embodiments, the accuracy of the observation-based performance assessment can be determined based on whether the achievement-based and the observation-based performance assessments are consistent. For example, the reporting module 210 may determine the observation-based performance assessment to be inaccurate if the observation-based performance assessment is negative and the achievement-based performance assessment is positive, or conversely, if the observation-based performance assessment is positive and the achievement-based performance assessment is negative.

Further, the reporting module 210 may determine the observation-based performance assessment to be accurate if both the observation-based performance and achievement-based performance assessments were negative or positive. However, if the both the observation-based performance and the achievement-based performance assessments were neutral, the reporting module 210 may report that the accuracy of the performance assessment made the by the observer could not be verified.

The reporting module 210 can generate a report describing the determination it made about the accuracy of the observer's performance assessment of a target subject and provide the report for display to the observer(s) or one or more other users, such as an administrator of the observer(s). In some embodiments, the reporting module 210 can generate the report in response to receiving a request from a client device 126 of an administrator/user 132 who oversees the observer. In other embodiments, the reporting module 210 can automatically generate and send the report to the administrator via an electronic message, such as an email, an internal messaging application provided by the professional development application, a text message, etc.

In some embodiments, the accuracy of all of the observer's performance assessments of a particular target subject or multiple target subjects may be determined by the reporting module 210 and included in the report. For example, the observer's overall accuracy in performing the observational assessments may be computed over time by the reporting module 210 to determine if the observer is consistently inaccurate with his/her observations. Additionally, the reporting module 210 may compare the accuracy of one or more of an observer's assessments of a target subject to the assessments of that target subject by other observers to determine whether they are consistent. If not, information describing the inconsistencies may be included in the report.

The reporting module 210 may also determine whether an observer is properly performing the observational assessments and can include this determination in the report. In some embodiments, the reporting module 210 may analyze the observation files for some or all target subjects observed by the observer to determine the level and quality of feedback provided by the observer about those subjects. For example, if the reporting module 210 determines that the assessments (e.g., answers, ratings, comments, etc.) for the target subjects made by the observer in the observation files are all the same or substantially similar, the reporting module 210 may determine that the observer is simply making the same assessments for each target subject and is not performing the assessments as required. The reporting module 210 may also make a determination as to the quality of one or more assessments performed by an observer based on the level and/or variety of feedback included in the observation file(s) for one or more target subjects.

The reporting module 210 may store any reports and/or data generated by it in the data store 110 for later access by the reporting module 210 or any other component of the professional development server 102, such as an administrative module (not shown) of the professional development application engine 104 that provides administrator/users access via the client application 128 to statistics and reports about the users 132 of the professional development service that the administrator oversees.

In the depicted embodiment, the reporting module 210 is coupled to the data store 110 via the bus 214 or the data store 140 via the network 102 and the third-party server 138 to receive the achievement data. For example, the reporting module 210 can periodically retrieve the achievement data from the third-party server 136 via an API and store it locally in the data store 110 for later access or use. In another example, the reporting module 210 can retrieve the achievement data real-time via the API for analysis and compare it to the observation-related data from the observation file. However, in other embodiments, the reporting module 210 may retrieve the achievement data from any information source communicatively coupled to the professional development server 102 or network 142 via the network.

The reporting module 210 provides numerous additional advantages including providing the target subject a mechanism for reporting on the completion of an assignment, providing an observer/user a mechanism to monitor whether the target subject(s) he/she observes completes the assignments assign to them, analyzing and reporting on an observer's performance and work quality, determining/rating effectiveness of target subjects, etc.

Additional functionality of the professional development application engine 104, the observation engine 106, and their corresponding components are further described below.

Example Client Device 126

Figure 3:
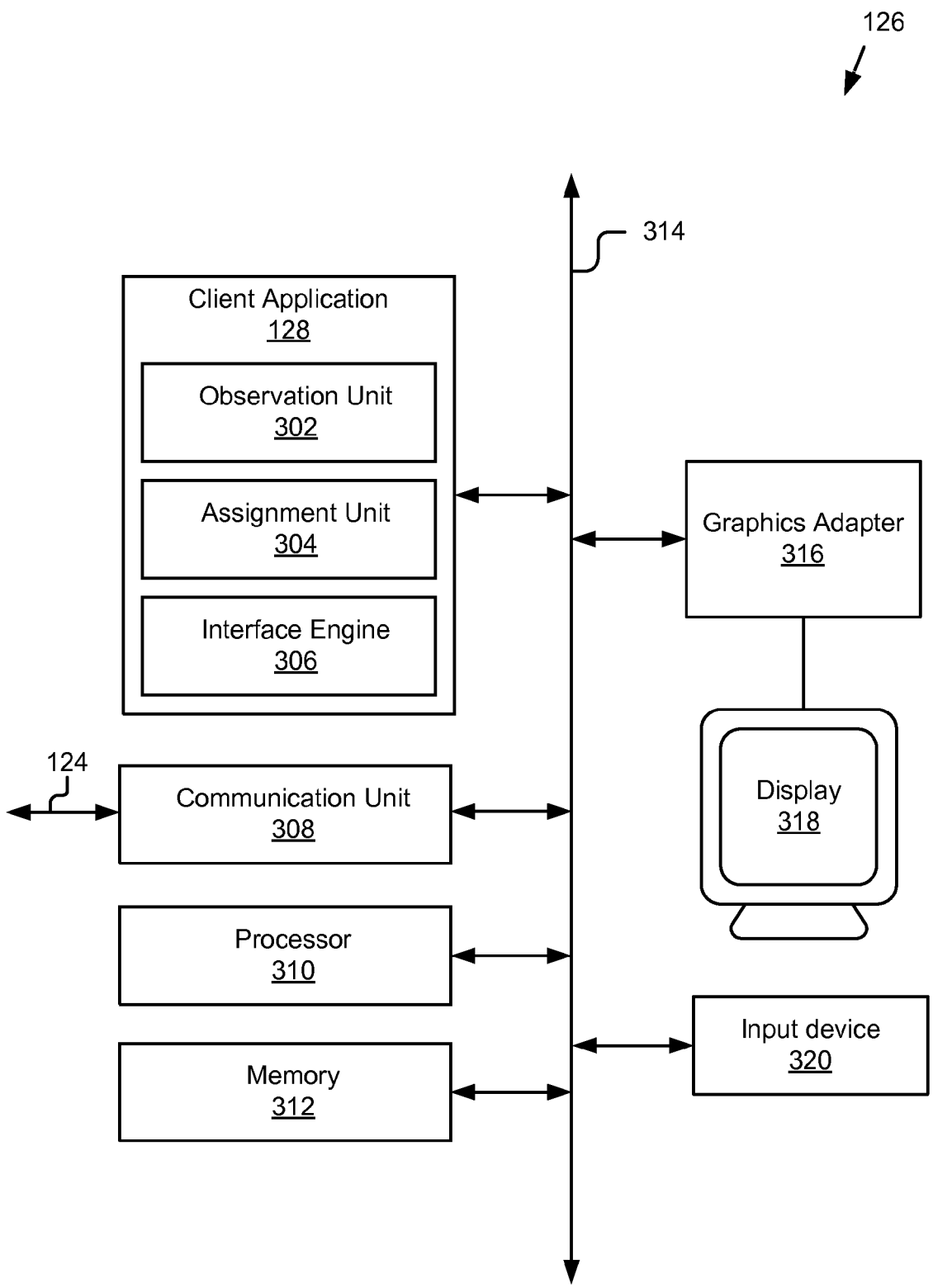
FIG. 3 is a block diagram illustrating an example client device.

FIG. 3 is a block diagram of an example client device 126. In the depicted embodiment, the client device 126 includes a client application 128. The client device 126 also includes a communication unit 308, a processor 310, a memory 312, a graphics adapter 316, a display 318, and an input device 320, which are communicatively coupled via the bus 314. In some embodiments, the functionality of the bus 314 may be provided by an interconnecting chipset.

The communication unit 308 includes interfaces for interacting with other devices/networks of devices. In some embodiments, the communication unit 308 includes transceivers for sending and receiving wireless signals. For example, the communication unit 308 includes radio transceivers (4G, 3G, 2G, etc.) for mobile network connectivity, and radio transceivers for WiFi and Bluetooth® connectivity. In these or other embodiments, the communication unit 308 may include a network interface device (I/F), which includes ports for wired connectivity. For example, the communication unit 308 may include a CAT-type interface, USB interface, or SD interface, etc. In the depicted embodiment, the communication unit 308 is coupled to the network 142 by the signal line 124.

The processor 310 comprises an arithmetic logic unit, a microprocessor, a general purpose controller, or some other processor array to perform computations and optionally provide electronic display signals to the display 318. The processor 310 may communicate with the other components via the bus 314. Processor 310 processes data signals and may comprise various computing architectures including a complex instruction set computer (CISC) architecture, a reduced instruction set computer (RISC) architecture, or an architecture implementing a combination of instruction sets. Although only a single processor is shown in FIG. 3, multiple processors may be included. The client device 126 also includes an operating system executable by the processor 310 as discussed elsewhere herein, for example, with reference to FIG. 1.

The memory 312 stores instructions and/or data that may be executed by processor 310. The memory 312 communicates with the other components of client device 126 via the bus 314. The instructions and/or data comprise code for performing any and/or all of the techniques described herein. In particular, the memory 312 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 310. A non-transitory computer-usable storage medium may include any and/or all computer-usable storage media. In some implementations, the memory 312 may include volatile memory, non-volatile memory, or both. In some implementations, the memory 312 may include volatile memory, non-volatile memory, or both. For example, the memory 312 may include a dynamic random access memory (DRAM) device, a static random access memory (SRAM) device, flash memory, a hard disk drive, a floppy disk drive, a CD ROM device, a DVD ROM device, a DVD RAM device, a DVD RW device, a flash memory device, or any other mass storage device known for storing information on a more permanent basis. It should be understood that the memory 312 may be a single device or may include multiple types of devices and configurations. In some embodiments, the client application 128 is stored in the memory 312 and executable by the processor 310.

The display 318 represents any device equipped to present output signals generated and provided by the client device 126. In some embodiments, the display 318 displays electronic images and data including, for example, user interfaces and formatted information. For example the display 318 may be any conventional display device, monitor or screen, such as an organic light-emitting diode (OLED) display, a liquid crystal display (LCD), an e-ink display, etc. In some embodiments, the display 318 is a touch-screen display capable of receiving input from one or more fingers of a user 132. For example, the display 318 may be a capacitive touch-screen display capable of detecting and interpreting multiple points of contact with the display surface. In some embodiments, the display 318 may be coupled to the bus 314 via a graphics adapter 316, which generates and provides display signals to the display 318. The graphics adapter 316 may be a separate processing device including a separate processor and memory (not shown) or may be integrated with the processor 310 and memory 312.

The input device 320 represents any device for inputting data on the client device 126. In some embodiments, the input device 320 is a touch-screen display capable of receiving input from the one or more fingers of the user 132. The functionality of the input device 320 and the display 318 may be integrated, and a user 132 of the client device 126 may interact with the client device 126 by contacting a surface of the display 318 using one or more fingers. For example, the user 132 may interact with an emulated (i.e., virtual or soft) keyboard displayed on the touch-screen display by using fingers to contacting the display in the keyboard regions. In other embodiments, the input device 320 is a separate peripheral device or combination of devices. For example, the input device 320 includes a keyboard (e.g., a QWERTY keyboard) and a pointing device (e.g., a mouse or touchpad). The input device 320 may also include a microphone (e.g., for voice input) or other known peripheral devices.

Example Client Application 128

The client application 128 is software including routines for sending and receiving data to the other entities of the system, including, for example, the professional development server 102, the media distribution server 118, and the third-party server 136. In some embodiments, the client application 128 is a web browser application for accessing the resources provided by the professional development server 102 and the media distribution server 118. For example, the professional development service operated by the professional development server 102 in cooperation with the media distribution server 118 may be a web-based service and the client application 128 may access various electronic resources provided by the service via uniform resource locators (URLs). In other embodiments, the client application 128 is an application customized specifically for accessing the professional development service, and more particularly, cooperating and interacting with the observation engine 106.

In the depicted embodiment, the client application 128 provides a user 132 (e.g., an observer) interacting with the client device 126 mechanisms for inputting viewing, adding, modifying, deleting observation-related data related to one or more other users 132. The client application 128 may cooperate with the observation engine 106 to conveniently store and retrieve observation templates and files. The client application 128 may, in some embodiments, send a resource request to the observation engine 106 to identify and provide recommended electronic resources that can be assigned to a user. The client application 128 may also send a request to the reporting module 210 to provide observation-related statistics and reports for display to the user via a report interface generated by the interface engine 306 of the client application 128.

In the depicted embodiment, the client application 128 includes an observation unit 302, an assignment unit 304, and an interface engine 306. The observation unit 302, the assignment unit 304, and the interface engine 306 are communicatively coupled with each other and the other components 308, 310, 312, 316, 318, and 320 of the client device 126. The components are also coupled to the network 142 via the communication unit 308 for communication with the other entities of the system 100. While not depicted, in some embodiments, the client application 128 may include an authentication module for authenticating the user 132 to access the professional development service.

In some embodiments, the client application 128, the observation unit 302, the assignment unit 304, and/or the interface engine 306 are sets of instructions executable by the processor 310 to provide their respective functionality. In other embodiments, the client application 128, the observation unit 302, the assignment unit 304, and/or the interface engine 306 are stored in the memory 312 of the client device 126 and are accessible and executable by the processor 310 to provide this functionality. In any of these embodiments, the client application 128, the observation unit 302, the assignment unit 304, and/or the interface engine 306 may be adapted for cooperation and communication with the processor 310 and other components of the client device 126.

In some embodiments, the observation-related data managed by the client application 128 may be locally stored in the memory 312, remotely stored in the data store 218, the social graph 214, the third-party server, or may be stored in any combination of the forgoing thereof. For example, an instance of the observation-related data may be stored locally on the client device 126 and remotely on the professional development server 102, and the client application 128 may synchronize the information via the network 142 as the information changes. In some embodiments, the client application 128 may be a stand-alone application or may be integrated into another application operable on the client device 126.

The observation unit 302 is software including routines for sending and receiving observation-related data to the observation module 204, cooperating with the interface engine 306 to display observation-related information to a user, and cooperating with the interface engine 306 to receive observation-related input from the user. In some embodiments, the observation unit 302 interacts with the observation module 204 to receive observation templates and observation files for display to the user 132 of the client device 126 and to send observation files to the observation module 204 for processing and/or storage in the data store 110, as discussed above with reference to at least FIG. 2.

In some embodiments, the observation unit 302 can cooperate with the observation module 204 via the network 142 to provide information about target subjects to an observer and provide functionality to the observer for assessing and tracking the performance and development of the target subjects. The observation unit 302 may also interact with the interface engine 306 to provide administrative tools such as a reporting tool for viewing statistics and other analytical data, and/or an observational tool for assessing the performance of subordinates, assigning development resources to those individuals, and tracking completion of the assignments. In some embodiments, the observation unit 302 interacts with the interface engine 306 to display observation templates and files to a user, as discussed with reference to at least FIG. 10 below.

The observation unit 302 may be coupled to the interface engine 306 to receive user input and display the information to the user 132 via user interfaces generated by the interface engine 306, such as the observation interface 302 discussed with reference to FIG. 10 below. For example, the observation unit 302 may send interface signals to the interface engine 306, and responsive to receiving these signals, the interface engine 306 may generate and display user interfaces that correspond to the instructions included in the interface signals. In another example, the interface engine 306 may receive input signals from a user via the input device 320 and send those signals to the observation unit 302 for processing. In some embodiments, in cooperation with the interface engine 308, the observation unit 302 can receive user-related and observation-related information and display the data to the user, display observation templates to the user, populate observation templates with user input, save observation files based on the observation templates, transmit observation-related data such as observation files to the observation module 204 or storage, receive observation-related statistics and reports and organize and display them to the user, receive electronic resources for assignment, consumption, etc., by the user, receive electronic communications from other users via the network 142 and display them to the user, etc. In some embodiments, an observer may, via a user interface rendered by the interface engine 306, preselect options and/or be guided similarly in designing observation templates and appropriate follow-up activities.

In some embodiments, the interface engine 306, in cooperation with the observation unit 302, may generate a report dashboard/interface for viewing reports generated and provided by the reporting module 210 and received by the observation unit 302. This dashboard provides numerous advantages including providing an observer or administrator with detailed information about a given target subject's performance (e.g., execution, effectiveness, compliance, etc.) over time. For example, the observer may be a school principal and may need to visit the classrooms of a number of his/her teachers to perform observational assessments of each of them. For each teacher, the principal may, using the dashboard, access any previous observational assessments of that teacher; view an overall performance (e.g., execution, effectiveness, compliance, etc.) rating/summary of that teacher; view the performance (e.g., execution, effectiveness, compliance, etc.) ratings/summaries of that teacher over time; view statistics across all observational assessments of that teacher or a subset, such as the observational assessments performed for that academic year; may quickly ascertain the areas a teacher has had problems with or has been working on, or the areas the teacher has been improving on; review the test scores for the students of the teacher, student and parent evaluations of the teacher; view the electronic training resources the teacher has consumed/interacted with; view any work-product, lesson plans, videos, presentation, etc., the teacher has uploaded, the professional learning communities and groups the teacher has interacted with, any mentors the teacher has been working with, etc. Using this information, the principal may quick get up-to-speed on where the teacher is at, thus provide pertinent and relevant observations (e.g., evaluations, ratings, suggestions, comments, etc.) and assignments, etc., during the observation session to be performed.

The assignment unit 304 is software including routines for generating and sending resource requests, receiving resource responses including one or more electronic resources identified by the assignment engine 208, and assigning one or more electronics resources to a user. In some embodiments, the assignment unit 304 cooperates and interacts with the assignment engine 210 to identify one or more electronic resources that can be assigned to a user, as discussed above with reference to at least FIG. 2.

The assignment unit 304 is coupled to the interface engine 306 to receive user input and provide information to the user 132 via user interfaces generated by the interface engine 306. In some embodiments, responsive to receiving user input signals, the assignment unit 304 can generate a resource request or an assignment request. In some embodiments, the input signals may specify which electronic resource(s) is/are being assigned and the user the resource(s) is/are being assigned to. For example, an observer performing and observation of a target subject, may select one or more of the videos identified by the recommendation engine 206 and displayed to the via a user interface, such as the observation interface 1000 illustrated in FIG. 10. The assignment unit 304 may also assign supplemental instructional, prescriptive and/or discipline related resources in response to one or more of these resource being assigned by an observer (e.g., after receiving a report about an initial assignment). In some embodiments, the assignment unit 304 assigns one or more of these resources by generating and sending an assignment request and receiving an assignment confirmation as discussed elsewhere herein. In addition, the assignment unit 304 may provide tools/functionality to the observer to provide the target subject with feedback, follow-up with the target subject about an assignment or an aspect observational assessment performed, provide recommendations of additional electronic resources to assign to the target subject upon completion of an initial assignment by the target subject, etc.

The interface engine 306 is software including routines for rendering user interfaces and for receiving user input. The interface engine 306 may be coupled to the input device 320 via the bus 314 to receive input signals from the user 132. For example, an observer/user 132 can select an answer to an observation-related question using the input device 320, and the interface engine 306 receives signals describing the answer. The interface engine 306 may store the input signals in the memory 312 for retrieval by the other elements of the client application 128, such as the assignment unit 304, or may provide the signals directly to the other elements of the client application 128.

The user interfaces generated by the interface engine 306 include interfaces for inputting, modifying, and deleting information, displaying notifications, rendering video, displaying images and text, displaying vector-based content, sending and storing information, etc. In some embodiments, the user interfaces include user interface elements that allow users 116 to interact with the client device 126 and input information and commands, such as text entry fields, selection boxes, drop-down menus, buttons, virtual keyboards and numeric pads, etc., as further discussed below with reference to FIG. 10.

Example Methods

Figure 4:
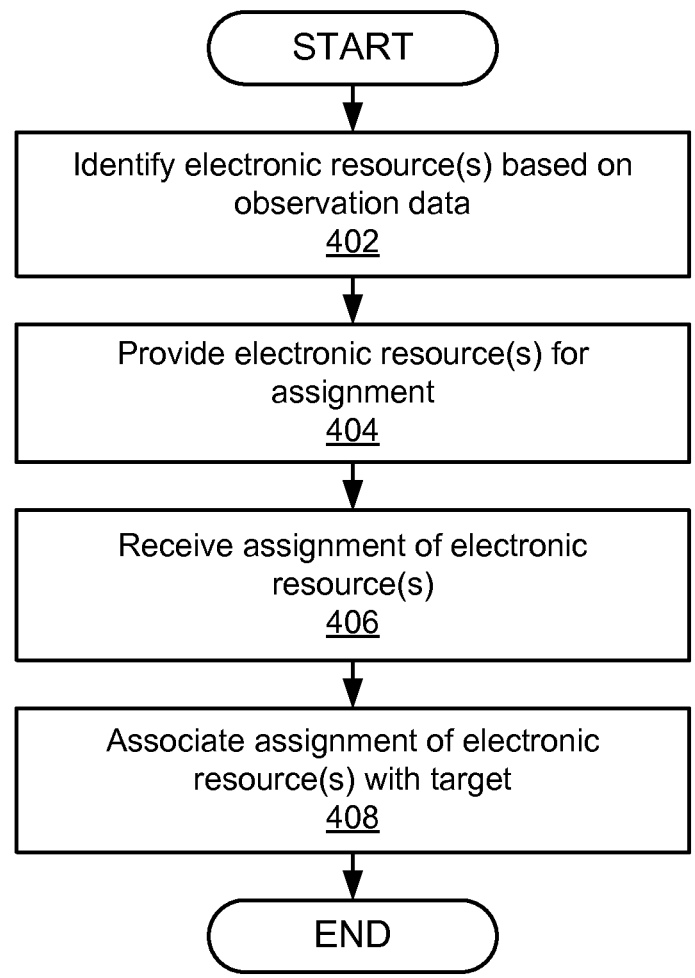
FIG. 4 is a flowchart of an example method for prescribing electronic resources based on observational assessments.

Referring now to FIG. 4, an example method 400 for prescribing electronic resources based on observational assessments is described. The method 400 begins by identifying 402 one or more electronic resources based on observation data. In some embodiments, the recommendation engine 206 identifies 402 the one or more electronic resources by querying a library of electronic resources for resources that match one or more aspects of the observation data. If a plurality of electronic resources is identified, the recommendation engine 206 can rank and filter the electronic resources and thus recommend which electronic resources are the most suitable for a target subject. Next, the method 400 provides 404 a summary of the one or more electronic resources to an observer, such as a supervisor or evaluator, for assignment to subject that he/she is observing. For example, the client device 126 of the observer may receive a summary of training videos or other resources identified and ranked by the recommendation engine 206 and may display the summary to the observer via a user interface. The observer may use the interface to preview the videos or other resources and/or assign one or more of the videos or other resources to the target subject.

Next, the method receives 406 an assignment of one or more electronic resources. In some embodiments, the assignment engine 208 receives an assignment request describing the one or more electronic resources that are to be assigned to the target subject by the assignment engine 208. The method 400 continues by associating 408 the assignment of the one or more electronic resources with the target subject. In some embodiments, to associate the assignment, the assignment engine 208 stores the assignment request or information therefrom in the data store 210 in association with the a user profile of the target subject. The method 400 is then complete and ends.

Figure 5:
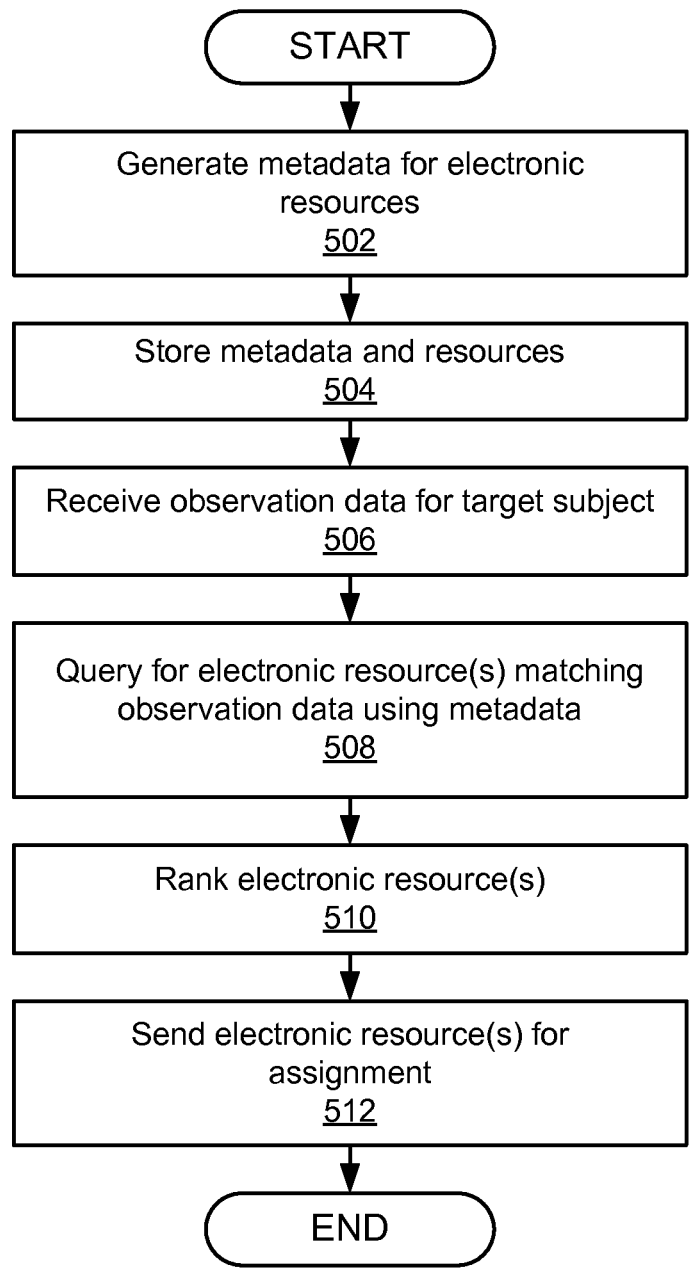
FIG. 5 is a flowchart of an example method for identifying and ranking electronic resources based on observational assessments.

FIG. 5 describes an example method 500 for identifying and ranking electronic resources based on observational assessments. The method 500 begins by generating 502 metadata for electronic resources, such as audio files, video files, vector-based files, electronic books, electronic publications, spreadsheets, word processing documents, presentational slides, etc. In some embodiments, the electronic resources are submitted for storage in the data store 110 and/or the media data store 122 along with metadata describing the contents and characteristics of the electronic resources. In other embodiments, metadata for the electronic resources are derived from the electronic resources themselves, for example by parsing header information included in the electronic resources. The method 500 then stores 504 the metadata and the associated electronic resources. For example, the metadata and associated electronic resources can be stored 504 in the data store 110 and/or in the media data store 122. In some embodiments, a resource library database is updated to include the metadata for the electronic resources, including for example, data describing the content and characteristics of the electronic resources and their stored location.

Next, the method 500 receives 506 observation data reflecting an observational assessment made about a target subject. In some embodiments, the observation data reflects an answer to a question from an observation template. For example, the observation data can describe how the target subject is performing with reference to a particular skill, requirement, standard, etc. Using the metadata associated with the electronic resources, the method 500 queries 508 for one or more electronic resources that match the observation data. The match can be loose and allow electronic resources that generally pertain to the observation data to be identified, or may be strict and require that the electronic resources be precisely directed to the assessment reflected in the observation data. For example, if the target subject is identified as lacking in his or her ability to communicate with students who speak English as a second language, a loose match may identify resources generally related to classroom communication, and a strict match may identify resources that specifically relate to communicating with students who speak English as second language.

The method 500 continues by ranking 510 the electronic resources identified in block 508, provided multiple electronic resources are identified. In some embodiments, the ranking of the electronic resources is based on one or more criteria. Examples of a criterion may include, but are not limited to, a conclusion, result, fact, statistic, or artifact included in the observation data, interaction data, demographics data, achievement data, student data, teacher data, and/or standards data. In one example, the electronic resources may be ranked based on student and teacher artifacts, such as student work or performance, lesson plan, curriculum maps, etc., so as to surface the resources that are the most relevant to the teachers, the subject being taught, and/or the direction of the curriculum being taught. In another example, the electronic resources may be ranked based on which electronic resources most closely match the observation data, how popular electronic resources are (e.g., how many times they have been uniquely interacted with), etc. In yet another example, the electronic resources may be ranked based on the progress/improvement a teacher is making, as identified in the observation data, in the achievement data for the students of the teacher, a combination of the foregoing, etc. It should be understood, however, that the above examples are provided by way of illustration and many other ways to rank the users are possible, contemplated, and within the scope of this disclosure.

This ranking is beneficial, as the electronic resources, or a description thereof, can automatically be provided in order of most relevant or useful to the observer for assignment to the target subject. In embodiments where only one resource is identified in block 508, the ranking in block 510 is skipped and the method 500 proceeds to block 512. Next, the method 500 sends 512 the electronic resource or resources for assignment to the target subject and the method 500 is complete and ends.

Figure 6:
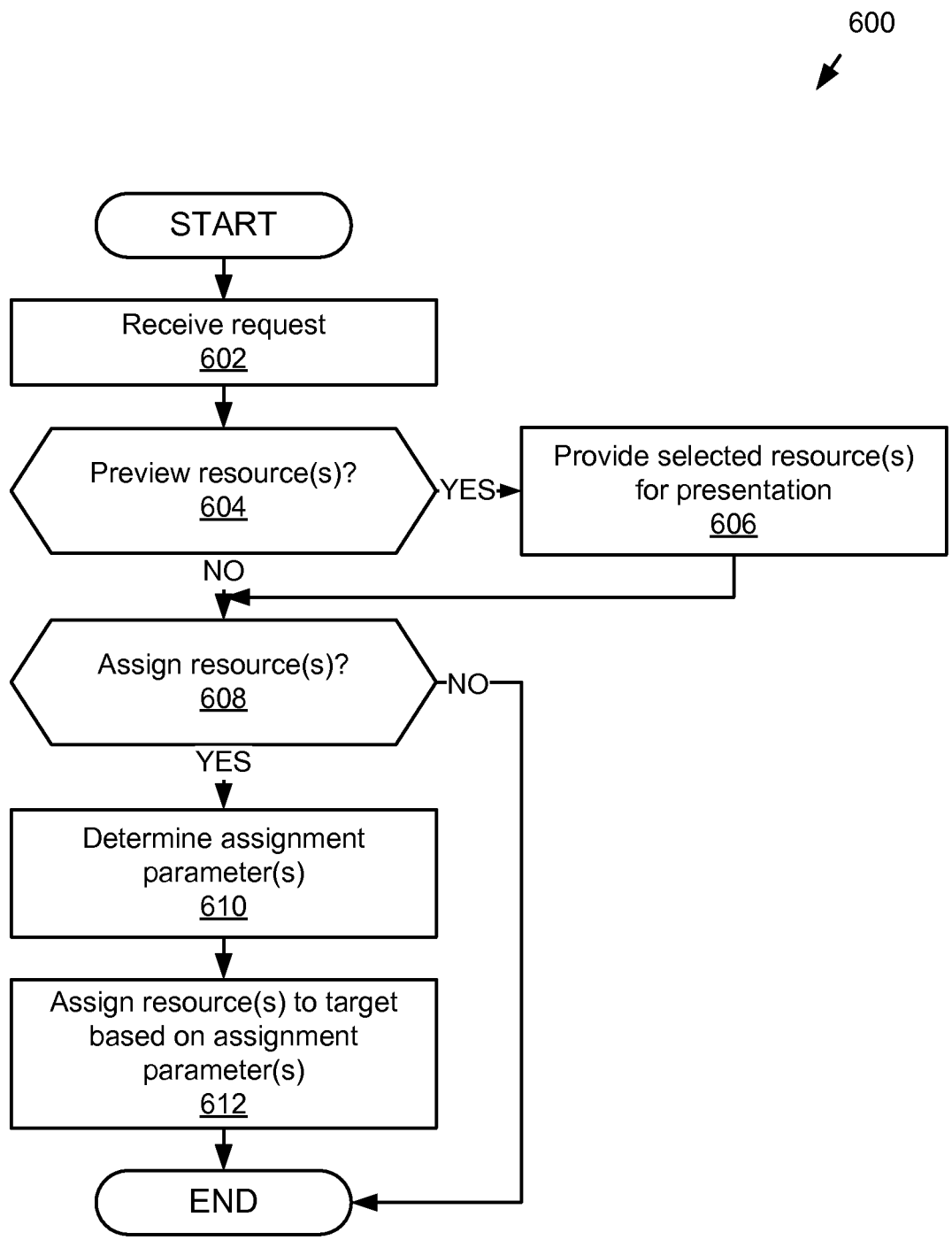
FIG. 6 is a flowchart of an example method for assigning electronic resources.

FIG. 6 describes an example method 600 for assigning electronic resources. The method 600 begins by receiving 602 a request. The request may be a request to preview a particular electronic resource or to assign one or more resources to a target subject, and may include information identifying the associated resource or resources. In some embodiments, the request may be received from a client device 126 via the network 142. The method 600 continues by determining 604 whether the request includes a preview request for previewing the resource. If so, the method 600 provides 606 the resource indicated in the preview request for presentation to the observer. In some embodiments, the electronic resource is provided by the professional development server 102 and/or media distribution server 118 via the network 142 to a client device 126 of the observer. In other embodiments, other entities coupled to the network 142 may provide the electronic resource. By way of example, an observer who received a list of electronic resources from the recommendation engine 206 via the client application 128 can preview one or more of the electronic resources to learn more about the resource or resources, determine whether the subject matter of the resource is appropriate for the target subject, etc.

If the method 600 determines 604 that the request does not include a preview request, the method 600 then determines 608 whether the request includes an assignment request for assigning one or more electronic resources to a target subject for completion. If so, the method 600 determines 610 if any assignment parameters are associated with the assignment request. In some embodiments, an assignment parameter places a condition on how the assignment of an electronic resource is to be completed. For example, the assignment parameter may be a due date by which the target subject must interact with the electronic resource by. As a further example, if electronic resource is a video, the assignment parameter may be a due date by which the target subject must watch the video by using an interface associated with the professional service. If it is determined 608 that the request does not include an assignment request, the method 600 is then complete and ends.

Next, the method 600 assigns 612 the one or more electronic resources to the target subject based on the one or more assignment parameters. In some embodiments, the method 600 may assign 612 the one or more electronics resources by storing a record of the assignment in the data store 110 in association with a user profile of the target subject. The record can include information describing the one or more electronic resources and the one or more assignment parameters. The method 600 is then complete and ends.

Figure 7A:
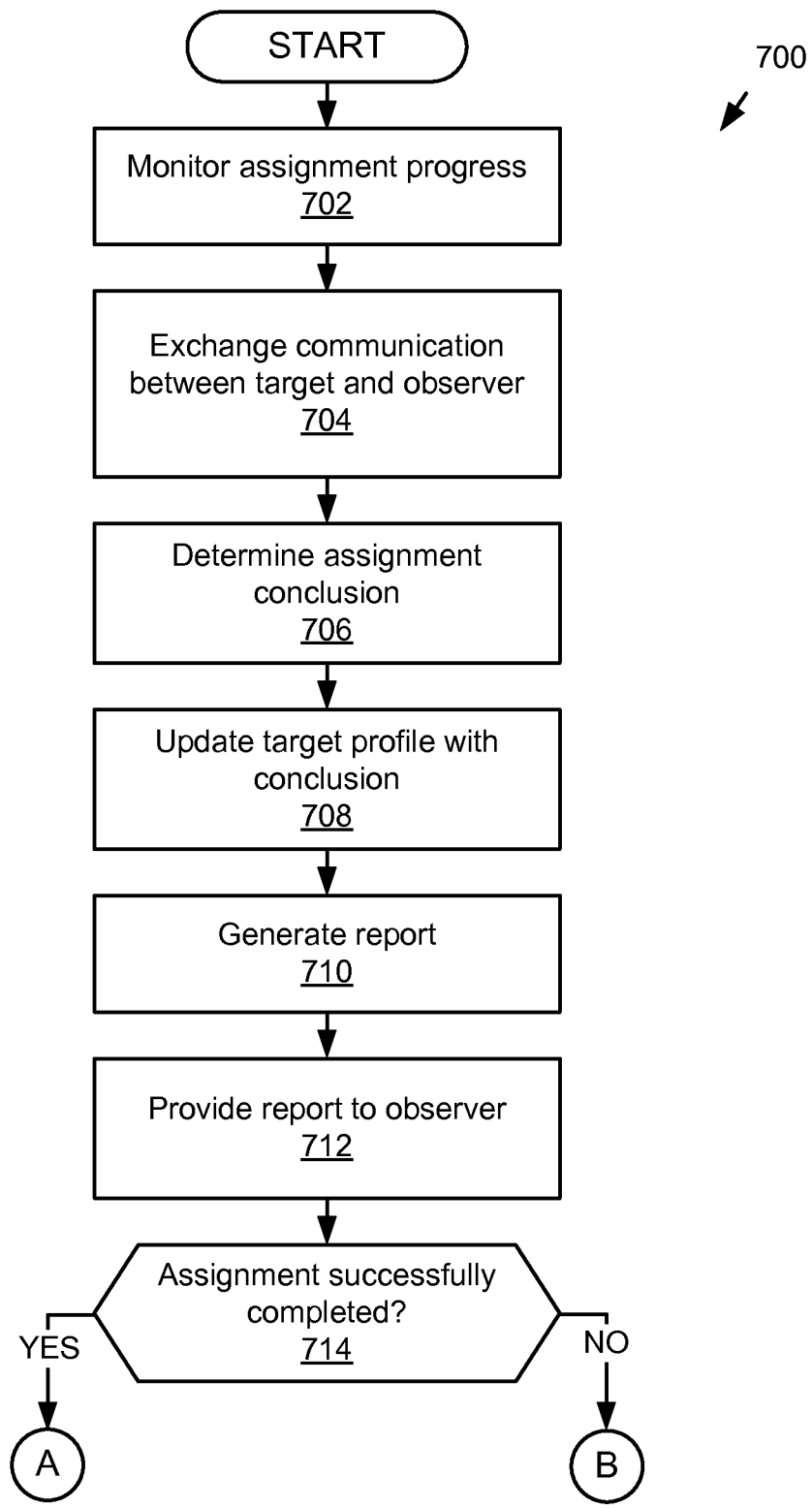
FIGS. 7A and 7B are flowcharts of an example method for monitoring and reporting on assigned electronic resources.
Figure 7B:
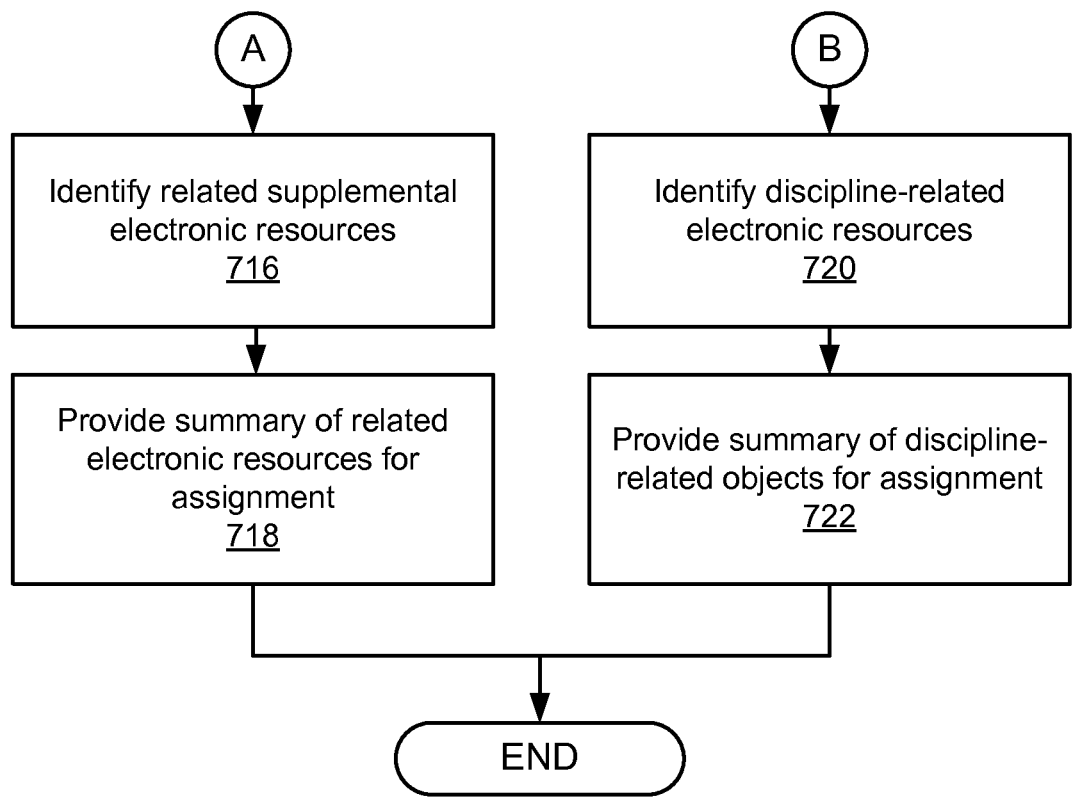

FIGS. 7A and 7B describe an example method 700 for monitoring and reporting on assigned electronic resources. The method 700 begins by monitoring 702 the progress of an assignment. The assignment may include the assignment of one or more electronic resources to target subject for completion/interaction by the target subject. The assignment may also include one or more assignment parameters that dictate how the assignment should be completed by the target subject, and the method 700 can analyze the assignment parameters to determine if the assignment has been completed. In some embodiments, the reporting module 210 is configured to monitor the status of the assignment, including whether the assignment has been fully completed, is in progress, or has not begun.

The method 700 continues by exchanging 704 communications between the target subject and the observer of the target subject. In some embodiments, the method 700 facilitates the exchange by providing the contact information (e.g., an electronic messaging address) of target subject to the observer and vice versa. In other embodiments, the method 700 exchanges communication by relaying electronic messages between messaging accounts of the target subject and the observer using an internal messaging service. Exchanging communication using other messaging services, such as email, instant messaging, SMS, etc., is also contemplated. In these embodiments, the method 700 may store record of any communications exchanged between the target subject and the observer for later reference and retrieval. Exchanging communication between the observer and the target subject is advantageous in a number of respects including that it provides a feedback loop between the target subject and the observer. For example, the target subject may communicate questions to the observer about what specific areas the target subject should focus on improving when interacting with an electronic resource assigned to him/her by the observer, and the observer may provide feedback to the target subject. In some embodiments, the communications exchanged by the method 700 may be included in a report generated by the reporting module 210 to summarize the interaction between a target subject and an observer.

Next, the method 700 determines 706 the conclusion of the assignment. For example, the method 700 can determine whether the assignment was successfully completed, was never begun, or was in progress at the conclusion of the time set for completing the assignment. The method 700 then updates 708 the user profile of the target subject to reflect the conclusion. In some embodiments, the reporting module 210 updates a record stored in the data store 110 with data reflecting the conclusion.

The method 700 continues by generating 710 a report describing the status of the assignment and providing it to the observer 712 and/or other users. The report may include the conclusion determined by the method in block 706, any electronic communication exchanged between the target subject in the observer in block 704, and any other information about the assignment, including a description of the electronic resource(s), information from the observation file associated with the assignment, statistics and results from other observational assessments performed previously of the target subject, any related industry standards, performance benchmarks, or job requirements, etc.

The method 700 then determines 714 whether the assignment was successfully completed. In some embodiments, this determination is based on the conclusion from block 706. If the method 700 determines 714 the assignment to have been successfully completed, the method 700 continues by identifying 716 one or more related supplemental electronic resources. In some embodiments, the method 700 identifies 716 these resources in response to receiving a supplemental resource request from a client device 126. In other embodiments, the method 700 identifies 716 the supplemental electronic resources in response to receiving a signal for the resources from one of the components of the observation engine 106. For example, upon determining that the assignment had been successfully completed, the reporting module 210 may signal the recommendation engine 206 to identify supplemental electronic resources related to the observation data or electronic resource associated with the assignment. The method 700 may then provide 718 a summary of the related supplemental electronic resources identified in block 716 to the observer or another user for assignment to the target subject. For example, a summary of these supplemental resources may be included in a report provided to the observer, and the client application 128 may display the report to the observer and provide functionality to the observer for assigning one or more of the supplemental resources to the target subject. In some embodiments, blocks 714-720 can be performed prior to block 710 and then information describing the additional resources identified in blocks 716 or 720 can be included in the report generated in block 710 and provided in block 712 to the observer. In these embodiments, blocks 718 and 722 would be eliminated.

If the method 700 determines 714 the assignment to have not been successfully completed, the method 700 continues by identifying 720 discipline-related electronic resources. In some embodiments, the reporting module 210 may signal the recommendation engine 206 to identify one or more discipline-related electronic resources that can be assigned to the target subject. The recommendation engine 206 may identify these resources based on the conclusion determined in block 706 and using operations that are substantially similar to or the same as the operations described above with reference to block 508 of method 500. The recommendation engine 206 may also rank these resources, for example, using the operations discussed above with reference to block 510 of method 500. Additionally or alternatively, one or more electronic resources that are discipline-related may be pre-prepared for circumstances where a target subject fails to complete an assignment, and may be identified as such in a data store, such as the resource library database. For example, in educational setting, a school district may have prepared an electronic resource, such as the instructional digital video, emphasizing the importance of the observation process and the need for target subjects to complete any professional development training assigned to them via the observation engine 106.

The method 700 may then provide 722 a summary of the discipline-related supplemental electronic resources identified in block 720 to the observer or another user for assignment to the target subject. For example, a summary of these electronics resources may be included in a report provided to the observer, and the client application 128 may display the report to the observer and provide functionality to the observer for assigning one or more of the discipline-related resources to the target subject. The method 700 is then complete and ends.

Figure 8:
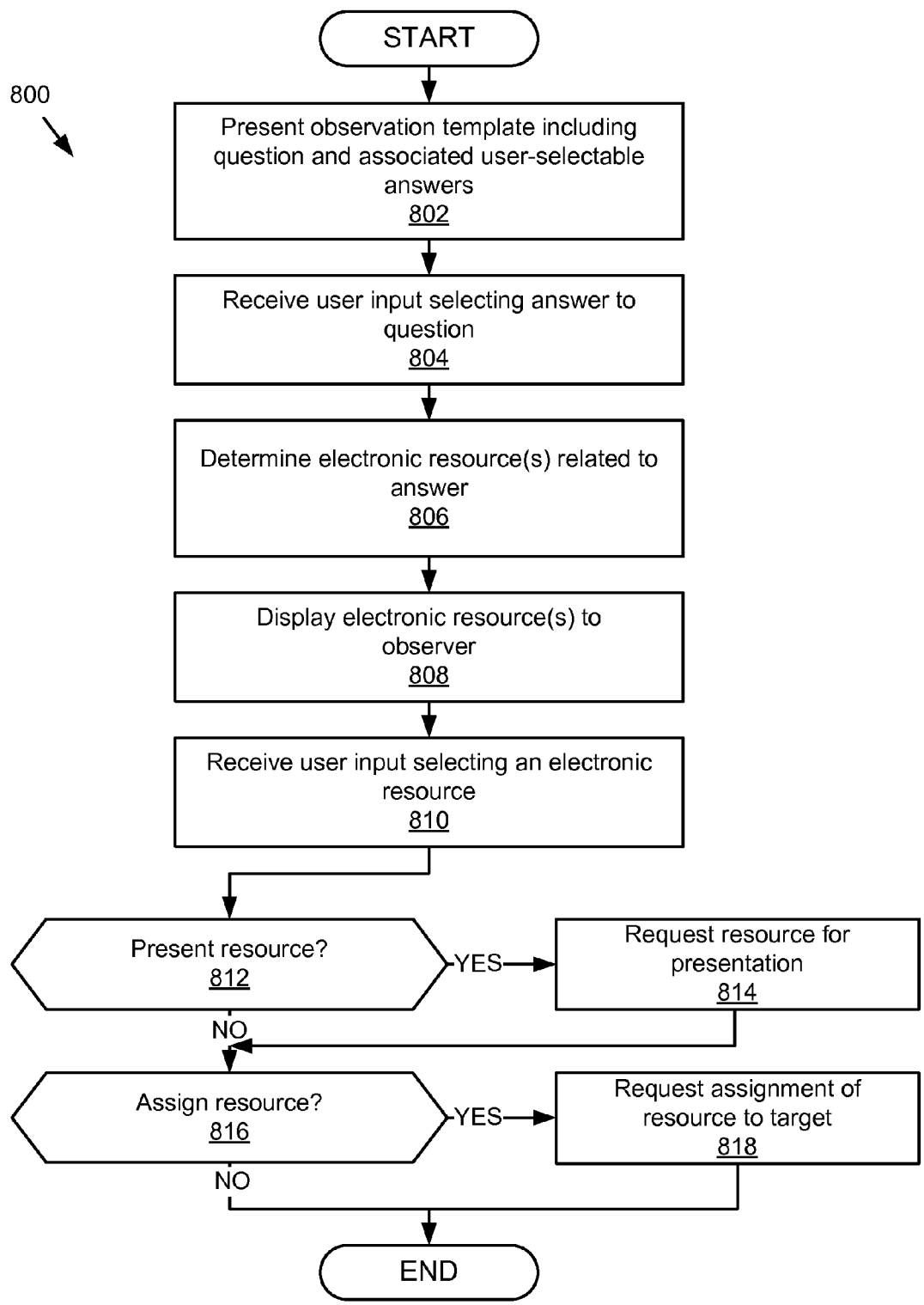
FIG. 8 is a flowchart of an example method for requesting assignment of an electronic resource.

FIG. 8 describes an example method 800 for requesting assignment of an electronic resource. The method 800 begins by presenting 802 an observation template including questions and associated user-selectable/definable answers to an observer of a target subject. In some embodiments, the interface engine 206 displays the observation template upon receiving interface signals from the observation unit 202. Next, the method receives 804 user input providing an answer to a question and, based on this answer, the method 800 determines 806 one or more electronic resources that can be assigned by the observer to the target subject. For example, the interface engine 306 receives input signals providing observation data from the observer via the input device 320 and the assignment unit 304 generates an assignment request based on the observation data and transmits it to the assignment engine 208. The assignment engine 208, in reply, identifies one or more electronic resources and sends them to the assignment unit 304 and the assignment unit 304 instructs the interface engine 306 to display the one or more electronic resources to the observer.

The one or more electronic resources are then displayed 808 by the method 800 to the observer. Next, the method 800 receives 810 user input selecting one of the electronic resources, and determines 812 whether the user input includes an instruction to present the resource for review. If so, the method 800 requests 814 the electronic resource for presentation. In some embodiments, the method 800 sends a presentation request to the server hosting the resource requesting the server provide the electronic resource for presentation. For example, the electronic resource is a video and the assignment engine 208 receives a video stream from the media distribution server 118 responsive to sending a preview request to the content engine 202. If the user input does not include an instruction to present the resource, the method continues by determining 816 whether the user input includes an instruction to assign the electronic resource to the target subject for completion. If so, the method 800 requests 818 the assignment of the electronic resource to the target subject. In some embodiments, an assignment request is sent by the assignment unit 304 to the assignment engine 208 via the network 142 requesting the electronic resource be assigned to the target subject for completion. If the method 800 determines 816 that the user input does not include an instruction to assign the electronic resource, the method 800 is then complete and ends.

Figure 9:
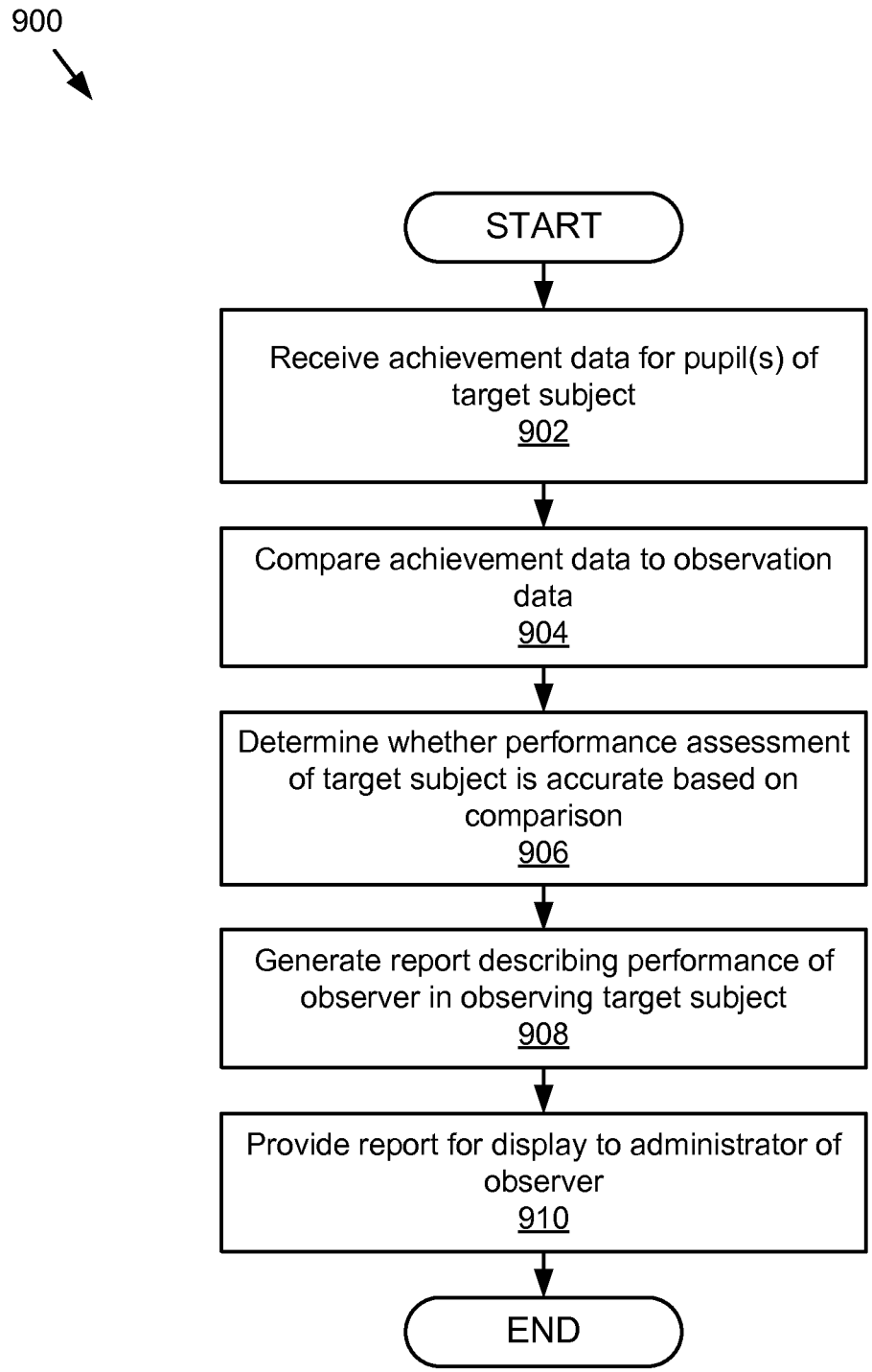
FIG. 9 is a flowchart of an example method for assessing performance of an observer of a target subject.

FIG. 9 describes an example method 900 for assessing performance of an observer of a target subject. The method 900 begins by receiving 902 achievement data for one or more pupils of the target subject and comparing 904 the achievement data to observation data associated with the target subject. For example, the reporting module 210 may access achievement data from the data store 110 or from the third-party server 136 and compare it to observation data also accessed from the data store 110. In some embodiments, the observation data may be pulled from an associated observation file stored in the data store. Based on the comparison, the method 900 determines 906 whether a performance assessment reflected by the observation data is accurate and generates 908 a report describing the performance of the observer based on the accuracy determination performed in block 906. For example, the reporting module 210 can generate a report describing the determination it made about the accuracy of the observer's performance assessment of a target subject (e.g., as reflected by the observation file). The method provides 910 the report for display to an administrator of the observer, and then completes and ends.

It should be understood that the methods 400-900 are provided by way of example, and the variations and combinations of these methods, as well as other methods, are contemplated. For example, in some embodiments, at least a portion of the methods 400-900 represent various segments of one or more larger methods and may be concatenated or various steps of these methods may be combined to produce other methods which are encompassed by the present disclosure. Additionally, it should be understood that the assignments of electronic resources and reporting on the conclusions of the assignments, as described with reference to at least the methods 400-900, could be iterative, and thus repeated as many times as necessary to assist a target subject with his or her professional development.

To illustrate various aspects of the system 100 and the methods 400-900, the following non-limiting example is provided. A school principal may visit the classrooms of each teacher in his/her school to observe the teacher in action and provide an assessment of the teacher's performance. The principal may launch the client application 128 on his/her wireless client device 126, and once launched, the observation unit 302 of the client application 128 may refresh a local repository with updated teacher information and observation templates received from the observation engine 106 via the network 142. The principal, using an interface generated by the interface engine 306, may select previously completed observation files for a given teacher to view how the teacher performed during previous observation sessions. The principal, using an interface of the client application 128, may also select to perform a new observation assessment of the teacher by selecting the observation template that should be used as a basis for the observation and the name of the teacher that he is to observe. In response to the selection, the observation unit 302 then opens the observation template for the principal to populate with his/her observations (e.g., assessments, evaluations, ratings, comments, etc.) and assignments, etc. The principal, using the question and answer/feedback fields provided in the template, provides input (observation data) assessing the performance (e.g., execution, compliance, effectiveness, etc.) of the teacher with respect to various criteria/standards.

Upon answering a question about whether the teacher implements effective classroom management to maximize student learning, the principal selects a predefined answer indicating that the teacher is "developing" in this area. The assignment unit 304 responds to receiving the input by sending a resource request to the recommendation engine 206 including information associated with the question and/or answer, and in reply, the recommendation engine 206, using the information provided with the resource request, identifies, ranks and provides a list of recommended training videos related to classroom management. This list is displayed by the interface engine 306 to the observer, and the observer selects the first video in the list and assigns it to the teacher with a due date of two weeks from the date of the observation using the functionality of the client application 128. In response, the assignment unit 304 sends an assignment request to the assignment engine 208, which records the assignment request in the data store 110 in association with a user profile of the teacher. The reporting module 210 monitors the teacher's progress in watching the training video and reports the progress to the observer by generating and sending weekly reports summarizing the progress to the observer via email. The reporting module 210 also stores the reports in the data store 110 for access by the principal via an interface of the client application 128. The teacher watches the video by accessing the video via a webpage served by the professional development application engine 104 in cooperation with the media distribution server 118 the day before the due date and the reporting module 210 reports the completion of the assignment to the principal by sending a report to the observer via email and storing the report in the data store 110 for later access by the observer via the client application 128.

Example User Interface

Figure 10:
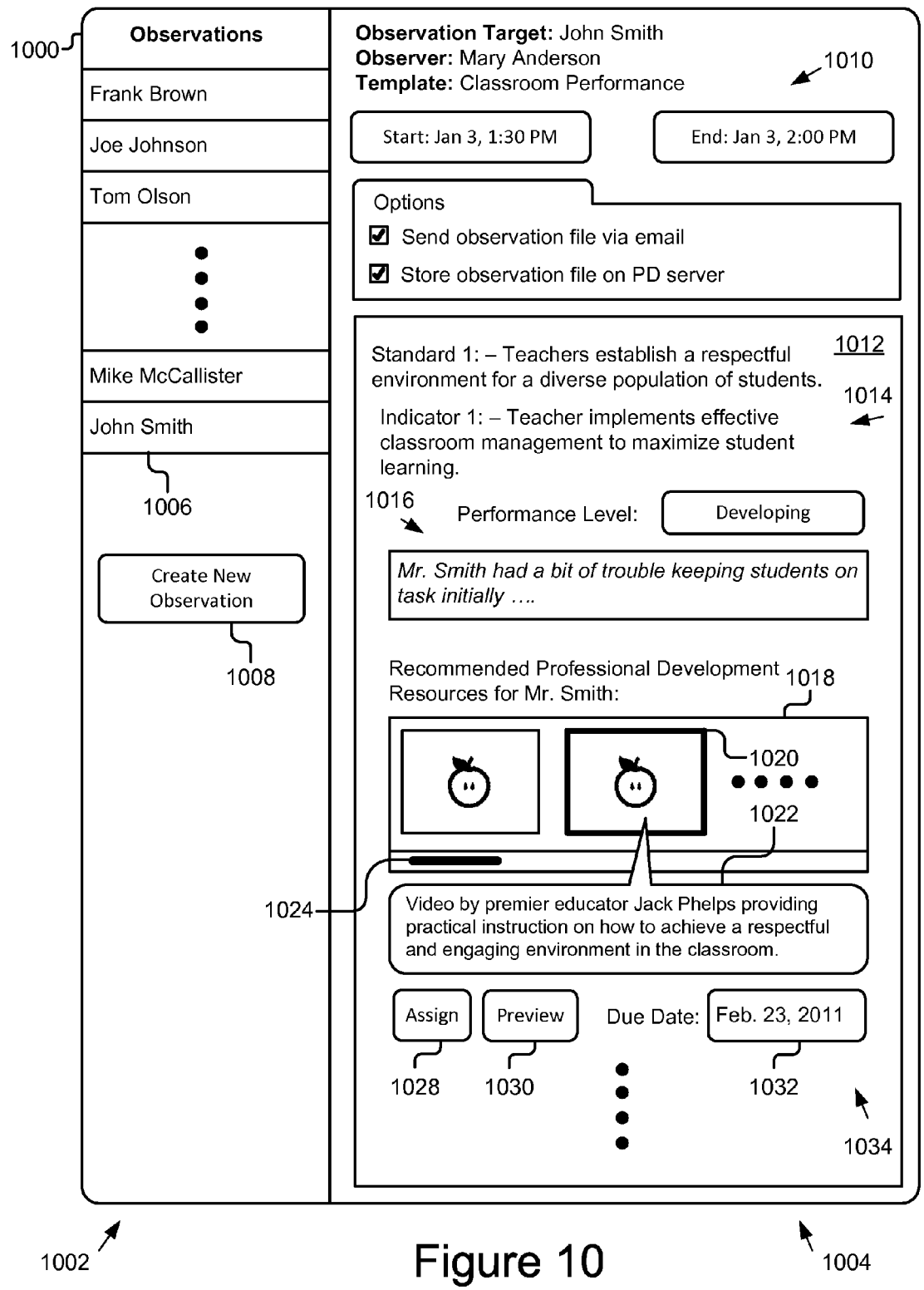
FIG. 10 is a graphic representation of an example observation interface for assigning electronic resources.

Referring now to FIG. 10, an example observation interface 1000 for assigning electronic resources is described. It should be understood that the user interface illustrated in FIG. 10 is provided merely by way of example, and that other user interfaces may be generated and displayed by the client application 128 to allow users 132 to interact with the system 100 and to allow the system 100 to present information to the users. For example, various user interfaces may be produced to display reports and statistics, display dialogs, set parameters and settings, send electronic communications, view, listen to and/or interact with the electronic resources provided by the professional development service, etc.

As depicted in FIG. 10, the observation interface 1000 includes a menu region 1002 and an observation region 1004. The menu region 1002 includes selectors 1006 for selecting the user for which an observation will be performed. The menu region 1002 also includes an observation creation button 1008. Selecting a user selector 1006 displays a corresponding observation file created/being created for that user. For example, in the depicted embodiment, the user selector 1004 for John Smith has been selected and a corresponding observation file for John Smith is being populated with assessment information by the observer in the observation region 1004. Selecting the observation creation button 1008 creates a new observation file from an observation template. In some embodiments, in response to the selection of the observation creation button 1000, a dialog (not shown) displaying a list of users is presented to the observer. In some embodiments, the list of users represents all of the users that are associated with a particular organization or company. For example, in educational setting, the list of users may include all of the teachers of a school, or may be a segmented list listing all of the schools within a school district and their corresponding teachers and administrators. In some embodiments, this list is provided on demand to the observation unit 302 by the observation module 204 via the network 142 and rendered for display by the interface engine 306. In other embodiments, the observation unit 302 may retrieve the list from a local repository and provide it to the interface engine 306 for display. Using the user interface, the observer may then select who the target subject is from the list of users, and responsive to receiving this input, the interface engine 306 may render the observation interface 1000 for the target subject similar to the one displayed in FIG. 10.

The observation region includes a header region 1010 and a body region 1012. The header region 1010 includes fields for displaying who the target subject of the observation is (e.g., John Smith), who the observer is (e.g., Mary Anderson), which observation template is being used for the observation, and for inputting the date and time the observation session was started and completed. The header region 1010 also includes an options dialogue for configuring settings, such as how the observation file is to be distributed and stored. For example, the observer may check a checkbox to set an option for storing the observation file in the data store 110 for later access.

The body region includes elements for the observer to input his/her assessments made during the observation. For example, as depicted in FIG. 9, the body region 1012 includes an assessment region 1014 including a standard that the target subject must meet, a question/indicator for the observer, and answer elements 1016 for answering the question/indication. For instance, the question/indicator states "[t]eacher implements effective classroom management to maximize student learning," and the observer inputs information indicating that the target subject's performance in this area is developing and information commenting about the target subject's performance.

As depicted, the body region 1012 also includes a resource region 1034 for displaying one or more electronic resources. In some embodiments, the electronic resources displayed in the resources region 1034 are received from the recommendation engine 206 and displayed in the resource region 1034 responsive to the observer inputting information into the answer elements 1016. For example, upon receiving the input from the observer, the observation unit 302 transmits a resource request to the recommendation engine 206 requesting a list of related electronic resources be provided based on the input (e.g., observation data).

The resource region 1034, as depicted, includes a resource scrolling region 1018, a scrollbar 1024, one or more electronic resources 1020, a resource description region 1022, an assignment button 1028, a preview button 1030, and a due date button 1032. The resource scrolling region 1018 provides the user with functionality to scroll through and select one or more of the various electronic resources displayed therein. The scrolling can be performed by interacting with the scrollbar 1024 or the resource scrolling region 1018 (e.g., swiping the resource scrolling region 1018 via a touch-sensitive display with an input element, such as a finger). The selecting can be performed by interacting with the representations of the electronic resources in the resource scrolling region. For example, selecting on an electronic resource once selects the resource, and selecting it again unselects the resource. Multiple selection is also possible using known selection methods.

Once one or more resources have been selected by the observer, they can be previewed or assigned using the corresponding preview and assignment buttons 1030 and 1028. In some embodiments, selecting the preview button transmits a request for a selected electronic resource, and once received, displays the selected electronic resource(s) in a preview interface with interface elements allowing the user to view and interact with the electronic resource. For example, the selected electronic resource is a video and the selecting the preview button displays a media player for viewing the video.

In some embodiments, selecting the assignment button 128 sends an assignment request to the assignment unit 304 requesting the assignment of the one or more selected electronic resources to the target subject. In reply, the assignment unit 304 may send a confirmation response to the assignment unit 304 indicating that the one or more resources were successfully assigned. Once this response has been received, the scrollable resource region may be refreshed to only display the resources that were assigned and the assignment button 1028 may change to an unassign button to indicate that the displayed resources have been assigned and provide functionality for the observer to unassign them if desired. The due date button is an example of an input element for setting an assignment parameter. As depicted, when the due date button is selected, a calendar dialog is displayed for selecting a date for when the assignment of the one or more electronic resources should be completed. It should be understood that the observation interface 1000 could include any number of interface elements for setting assignment parameters.

In some embodiments, the resource region 1034 may initially be hidden from display until the user inputs observation data into one or more of the answer elements 1016. In other embodiments, the resource region 1034 may always be displayed, or may be hidden or displayed by selecting a corresponding expansion/contraction button (not shown). While only one assessment region 1014 and resource region 1034 are displayed in the depicted embodiment, it should be understood that numerous assessment regions 1014 and corresponding resource regions 1034 could be included. For example, there could be numerous standards and associated questions/indicators for measuring the target subject's performance during observation, and thus numerous corresponding resource regions for displaying electronic resources that correspond to the various assessments that have been made by the observer during the observation session.

An example system and methods for prescribing electronic resources based on observational assessments have been described. In the above description, for purposes of explanation, numerous specific details are set forth in order to provide a thorough understanding of the present disclosure. It should be understood that the technology described in the various example embodiments can be practiced without these specific details. In other instances, structures and devices are shown in block diagram form in order to avoid obscuring the description.

Reference in the present disclosure to "some embodiments," "an embodiment," "an example embodiment," "other embodiments," etc., means that a particular feature, structure, or characteristic described in connection with the embodiment is included in at least one embodiment of the description. The appearances of the phrase "in some embodiments" in various places in the present disclosure are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including, for example, "processing" or "computing" or "calculating" or "ranking" or "identifying" or "determining" or "displaying" or "receiving" or "conducting" or "collecting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the present disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium including, for example, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The present disclosure can take the form of an entirely hardware embodiment, an entirely software embodiment or an embodiment containing both hardware and software elements. In a preferred embodiment, the present disclosure is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, wireless adapters, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description. In addition, the present disclosure is not described with reference to any particular programming language. It will be appreciated that a variety of programming languages may be used to implement the teachings of the present disclosure as described herein.

It is intended that the scope of the disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present disclosure or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the present disclosure is implemented as software, the component can be implemented as a standalone program, as part of a larger program, as a plurality of separate programs, as a statically or dynamically linked library, as a kernel loadable module, as a device driver, and/or in every and any other way. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
generating an observation interface including an observation region having one or more fields for inputting observation data and resource region for displaying and previewing recommended training resources, the observation interface being associated with a target subject;
providing the observation interface for display on a display device of a computing device of an observer of the target subject;
receiving an input via the displayed observation interface, the input including observation data reflecting an observational assessment by the observer of the target subject that compares an aspect of a performance by the target subject to a predetermined performance standard;

receiving resource data identifying one or more recommended electronic training resources that provide training related to the predetermined performance standard;

updating a resource region of the observation interface using the resource data to include a representation of each of the one or more recommended electronic training resources, the resource region further including a user-selectable preview element to preview an electronic resource from the one or more recommended electronic training resources, and a user-selectable assignment element for assigning at least one electronic resource of the one or more recommended electronic training resources displayed in the resource region of the observation interface to the target subject for completion;

receiving a selection by the observer of the user-selectable assignment element to assign at least one electronic resource of the one or more recommended electronic training resources included in the resource region to the target subject for completion; and responsive to receiving the selection, recording an assignment of the at least one electronic resource to the target subject for completion by recording assignment data reflecting the assignment of the at least one electronic resource in a non-transitory data store in association with the target subject.

2. The computer-implemented method of claim 1, further comprising:

identifying the one or more recommended electronic training resources by at least matching metadata associated with the one or more recommended electronic training resources to one or more aspects of the observation data reflecting an area in which the target subject should receive the training and how the target subject is performing in that area.

3. The computer-implemented method of claim 1, wherein the one or more recommended electronic training resources include a plurality of electronic resources and the method further comprises:

determining an effectiveness for each of the plurality of electronic resources based on how much a set of target subjects improved relative to the predetermined standard by utilizing that electronic resource, the set of target subjects having a profile substantially similar to the target subject; and prior to updating the resource region to include the representation of each of the electronic resources of the plurality, ranking the plurality of electronic resources based on the effectiveness of each of the electronic resources.

4. The computer-implemented method of claim 1, wherein the recording of the assignment data includes associating the at least one electronic resource with a profile of the target subject in the non-transitory data store, and the assignment is an instruction for the target subject to interact with the at least one electronic resource.

5. The computer-implemented method of claim 1, wherein the resource region of the observation interface further includes a user-selectable due date input element selectable by the observer to input a due date for the target subject to complete the assignment of the at least one electronic resource, and the method further comprises:

receiving a selection by the observer of a due date input using the user-selectable due date input element, the due date being an assignment parameter associated with the assignment and setting a condition that the target subject must complete the assignment by the due date.

6. The computer-implemented method of claim 1, wherein the at least one electronic resource includes one or more of textual data, image data, video data and audio data.

7. The computer-implemented method of claim 1, wherein the at least one electronic resource is a digital video transmittable via a network.

8. The computer-implemented method of claim 1, comprising:

monitoring, using the one or more computing devices, whether the assignment has been completed by the target subject by receiving interaction data reflecting an interaction with the at least one electronic resource by the target subject and analyzing the interaction data and an assignment parameter associated with the assignment to determine whether the assignment parameter has been satisfied;

generating a report based on the analyzing describing whether the assignment has been completed by the target subject; and providing the report for display to the observer.

9. The computer-implemented method of claim 1, comprising:

receiving achievement data for at least one pupil of the target subject; and determining whether the observational assessment of the target subject by the observer is accurate based at least in part on the achievement data.

10. The computer-implemented method of claim 9, comprising:

generating a report describing an accuracy of the observational assessment by the observer based at least in part on the determining whether the observational assessment is accurate; and providing the report for display to an administrator of the observer.

11. A computer program product comprising a non-transitory computer-usable medium including instructions which, when executed by a computer, cause the computer to:

generate an observation interface including an observation region having one or more fields for inputting observation data and resource region for displaying and previewing recommended training resources, the observation interface being associated with a target subject;

provide the observation interface for display on a display device of a computing device of an observer of the target subject;

receive an input via the displayed observation interface, the input including observation data reflecting an observational assessment by the observer of the target subject that compares an aspect of a performance by the target subject to a predetermined performance standard;

receive resource data identifying one or more recommended electronic training resources that provide training related to the predetermined performance standard;

update a resource region of the observation interface using the resource data to include a representation of each of the one or more recommended electronic training resources, the resource region further including a user-selectable preview element to preview an electronic resource from the one or more recommended electronic training resources, and a user-selectable assignment element for assigning at least one electronic resource of the one or more recommended electronic training resources displayed in the resource region of the observation interface to the target subject for completion;

receive a selection by the observer of the user-selectable assignment element to assign at least one electronic resource of the one or more recommended electronic training resources included in the resource region to the target subject for completion; and responsive to receiving the selection, recording an assignment of the at least one electronic resource to the target subject for completion by recording assignment data reflecting the assignment of the at least one electronic resource in a non-transitory data store in association with the target subject.

12. The computer program product of claim 11, further comprising:
identifying the one or more recommended electronic training resources by at least matching metadata associated with the one or more recommended electronic training resources to one or more aspects of the observation data reflecting an area in which the target subject should receive the training and how the target subject is performing in that area.

13. The computer program product of claim 11, wherein the one or more recommended electronic training resources include a plurality of electronic resources and the instructions further cause the computer to:
determine an effectiveness for each of the plurality of electronic resources based on how much a set of target subjects improved relative to the predetermined standard by utilizing that electronic resource, the set of target subjects having a profile substantially similar to the target subject; and
prior to updating the resource region to include the representation of each of the electronic resources of the plurality, rank the plurality of electronic resources based on the effectiveness of each of the electronic resources.

14. The computer program product of claim 11, wherein the recording of the assignment data includes associating the at least one electronic resource with a profile of the target subject in the non-transitory data store, and the assignment is an instruction for the target subject to interact with the at least one electronic resource.

15. The computer program product of claim 11, wherein the resource region of the observation interface further includes a user-selectable due date input element selectable by the observer to input a due date for the target subject to complete the assignment of the at least one electronic resource, and the computer program product further comprises:
receiving a selection by the observer of a due date input using the user-selectable due date input element, the due date being an assignment parameter associated with the assignment and setting a condition that the target subject must complete the assignment by the due date.

16. The computer program product of claim 11, wherein the at least one electronic resource includes one or more of textual data, image data, video data and audio data.

17. The computer program product of claim 11, wherein the at least one electronic resource is a digital video transmittable via a network.

18. The computer program product of claim 11, wherein the instructions further cause the computer to:
monitor whether the assignment has been completed by the target subject by receiving interaction data reflecting an interaction with the at least one electronic resource by the target subject and analyzing the interaction data and an assignment parameter associated with the assignment to determine whether the assignment parameter has been satisfied;

generate a report based on the analyzing describing whether the assignment has been completed by the target subject; and
provide the report for display to the observer.

19. The computer program product of claim 11, wherein the instructions further cause the computer to:
receive achievement data for at least one pupil of the target subject; and
determine whether the observational assessment of the target subject by the observer is accurate based at least in part on the achievement data.

20. The computer program product of claim 19, wherein the instructions further cause the computer to:
generate a report describing an accuracy of the observational assessment by the observer based at least in part on the determining whether the observational assessment is accurate; and
provide the report for display to an administrator of the observer.

21. A system comprising:
one or more processors;
an interface engine executable by the one or more processors to generate an observation interface including an observation region having one or more fields for inputting observation data and resource region for displaying and previewing recommended training resources, the observation interface being associated with a target subject, and to provide the observation interface for display on a display device of a computing device of an observer of the target subject;
a recommendation engine executable by the one or more processors to receive an input via the displayed observation interface, the input including observation data reflecting an observational assessment by the observer of the target subject that compares an aspect of a performance by the target subject to a predetermined performance standard, to receive resource data identifying one or more recommended electronic training resources that provide training related to the predetermined performance standard, and to update a resource region of the observation interface using the resource data to include a representation of each of the one or more recommended electronic training resources, the resource region further including a user-selectable preview element to preview an electronic resource from the one or more recommended electronic training resources, and a user-selectable assignment element for assigning at least one of the one or more recommended electronic training resources displayed in the resource region of the observation interface to the target subject for completion;
an assignment engine executable by the one or more processors to receive a selection by the observer of the user-selectable assignment element to assign at least one electronic resource of the one or more recommended electronic training resources included in the resource region to the target subject for completion, responsive to receiving the selection, to record an assignment of the at least one electronic resource to the target subject for completion by recording assignment data reflecting the assignment of the at least one electronic resource in a non-transitory data store in association with the target subject.

22. The system of claim 21, wherein the recording of the assignment data includes associating the at least one electronic resource with a profile of the target subject in the non-transitory data store, and the assignment is an instruction for the target subject to interact with the at least one electronic resource.

23. The system of claim 21, wherein the resource region of the observation interface further includes a user-selectable due date input element selectable by the observer to input a due date for the target subject to complete the assignment of the at least one electronic resource, and the assignment engine is further configured to
receive a selection by the observer of a due date input using the user-selectable due date input element, the due date being an assignment parameter associated with the assignment and setting a condition that the target subject must complete the assignment by the due date.

24. The system of claim 21, wherein the at least one electronic resource includes one or more of textual data, image data, video data, and audio data.

25. The system of claim 21, wherein the at least one electronic resource is a digital video transmittable via a network.

26. The system of claim 21, wherein the recommendation engine identifies the one or more recommended electronic training resources by at least matching metadata associated with the one or more recommended electronic training resources to one or more aspects of the observation data reflecting an area in which the target subject should receive the training and how the target subject is performing in that area.

27. The system of claim 21, wherein the one or more recommended electronic training resources comprise a plurality of electronic resources and the recommendation engine is further configured to:
determine an effectiveness for each of the plurality of electronic resources based on how much a set of target subjects improved relative to the predetermined standard by utilizing that electronic resource, the set of target subjects having a profile substantially similar to the target subject; and
prior to updating the resource region to include the representation of each of the electronic resources of the plurality, rank the plurality of electronic resources.

28. The system of claim 21, comprising:
a reporting module executable by the one or more processors to monitor whether the assignment has been completed by the target subject by receiving interaction data reflecting an interaction with the at least one electronic resource by the target subject and analyzing the interaction data and an assignment parameter associated with the assignment to determine whether the assignment parameter has been satisfied, to generate a report based on the analyzing describing whether the assignment has been completed by the target subject, and to provide the report for display to the observer.

29. The system of claim 21, comprising:
a reporting module executable by the one or more processors to receive achievement data for at least one pupil of the target subject and to determine whether the observational assessment of the target subject by the observer is accurate based at least in part on the achievement data, the reporting module coupled to an information source to receive the achievement data.

30. The system of claim 29, wherein the reporting module is further configured to generate a report describing an accuracy of the observational assessment by the observer based at least in part on the determining whether the observational assessment is accurate, and to provide the report for display to an administrator of the observer.

* * * * *